United States Patent
Jain

(10) Patent No.: US 10,453,082 B2
(45) Date of Patent: *Oct. 22, 2019

(54) ACCREDITED ADVISOR MANAGEMENT SYSTEM

(71) Applicant: YP LLC, Tucker, GA (US)

(72) Inventor: Mehul Jain, Foster City, CA (US)

(73) Assignee: YP LLC, D/FW Airport, TX (US)

( * ) Notice: Subject to any disclaimer, the term of this patent is extended or adjusted under 35 U.S.C. 154(b) by 228 days.

This patent is subject to a terminal disclaimer.

(21) Appl. No.: 15/693,922

(22) Filed: Sep. 1, 2017

(65) Prior Publication Data
US 2018/0025367 A1  Jan. 25, 2018

Related U.S. Application Data

(63) Continuation of application No. 14/271,339, filed on May 6, 2014, now Pat. No. 9,799,043.

(60) Provisional application No. 61/820,552, filed on May 7, 2013, provisional application No. 61/820,554, filed on May 7, 2013, provisional application No. 61/820,559, filed on May 7, 2013, provisional application No. 61/820,565, filed on May 7, 2013.

(51) Int. Cl.
*G06Q 10/00* (2012.01)
*G06Q 30/02* (2012.01)
*H04L 29/08* (2006.01)
*H04L 29/06* (2006.01)

(52) U.S. Cl.
CPC ......... *G06Q 30/0201* (2013.01); *H04L 67/16* (2013.01); *H04L 67/306* (2013.01); *H04L 67/38* (2013.01)

(58) Field of Classification Search
None
See application file for complete search history.

(56) References Cited

U.S. PATENT DOCUMENTS 270,108 A    1/1883  Pennington
7,023,979 B1 * 4/2006  Wu ............... H04M 3/5233
                                            379/265.11
(Continued)

OTHER PUBLICATIONS

Real-Time Speech Analytics, Mar. 19, 2016, Enghouse Interactive, https://web.archive.org/web/20160319191853/https://enghouseinteractive.co.uk/products/quality-control/real-time-speech-analytics/, p. 1-4.*

(Continued)

*Primary Examiner* — Joseph M Waesco
(74) *Attorney, Agent, or Firm* — Mark E. Stallion; Greensfelder, Hemker & Gale, P.C.

(57) ABSTRACT

Systems and methods for an accredited advisor management are provided. First information enabling unique identification of a first advisor may be processed. The first advisor may be matched to a first category of advising services. Input from the first advisor may be processed based at least in part on the first category. Data sources corresponding to accrediting authorities may be selected. Credential information that came electronically from the data sources may be processed. A first set of advisor information may be consolidated at least partially based on the input and on the credential information. A second set of advisor information may be prepared for exposure to advisees. At least part of the second set of advisor information may be transmitted to an end-user communication device.

20 Claims, 12 Drawing Sheets

(56) References Cited

U.S. PATENT DOCUMENTS

| | | | |
|---|---|---|---|
| 8,332,517 B2 | 12/2012 | Russell | |
| 9,247,470 B2 | 1/2016 | Jain et al. | |
| 2002/0091607 A1* | 7/2002 | Sloan | G06Q 30/02 705/36 R |
| 2002/0095363 A1* | 7/2002 | Sloan | G06Q 40/02 705/36 R |
| 2002/0194003 A1* | 12/2002 | Mozer | G06F 21/32 704/270.1 |
| 2005/0138216 A1* | 6/2005 | Giles | G06Q 40/06 710/1 |
| 2006/0074788 A1* | 4/2006 | Grizack | G06Q 40/00 705/35 |
| 2008/0062895 A1* | 3/2008 | Chapman | G06Q 10/10 370/270 |
| 2008/0147741 A1* | 6/2008 | Gonen | G06Q 10/06 |
| 2008/0262901 A1* | 10/2008 | Banga | G06Q 10/06375 705/14.53 |
| 2009/0055242 A1* | 2/2009 | Rewari | G06Q 10/06 705/7.34 |
| 2010/0114748 A1* | 5/2010 | Duke | G06Q 40/00 705/35 |
| 2010/0191846 A1 | 7/2010 | Raleigh | |
| 2010/0299277 A1* | 11/2010 | Emelo | G06Q 50/01 705/319 |
| 2011/0010173 A1* | 1/2011 | Scott | H04M 3/42221 704/235 |
| 2011/0066470 A1* | 3/2011 | Goyal | G06F 16/957 705/7.14 |
| 2011/0106660 A1 | 5/2011 | Ajjarapu et al. | |
| 2011/0302117 A1 | 12/2011 | Pinckney et al. | |
| 2013/0016816 A1* | 1/2013 | Odinak | H04M 3/5175 379/88.01 |
| 2013/0016823 A1* | 1/2013 | Odinak | H04M 3/5175 379/265.02 |
| 2013/0124268 A1* | 5/2013 | Hatton | G06Q 10/063112 705/7.38 |
| 2013/0246053 A1* | 9/2013 | Scott | H04M 3/42221 704/201 |
| 2014/0189802 A1 | 7/2014 | Montgomery | |
| 2014/0207532 A1* | 7/2014 | Thapliyal | G06Q 10/06398 705/7.42 |
| 2014/0270108 A1* | 9/2014 | Riahi | H04M 3/4936 379/88.01 |
| 2014/0270109 A1* | 9/2014 | Riahi | H04M 3/4936 379/88.01 |
| 2014/0270146 A1* | 9/2014 | Riahi | H04M 3/4936 379/265.13 |
| 2014/0337093 A1 | 11/2014 | Jain | |
| 2014/0337094 A1 | 11/2014 | Jain | |
| 2014/0337527 A1 | 11/2014 | Jain | |
| 2014/0343991 A1* | 11/2014 | Hofstee | G06Q 30/0601 705/7.18 |
| 2015/0006259 A1* | 1/2015 | Yoo | G06Q 10/06393 705/7.39 |
| 2015/0066593 A1* | 3/2015 | Huang | G06Q 30/0202 705/7.31 |
| 2015/0127628 A1* | 5/2015 | Rathod | H04W 4/21 707/710 |
| 2015/0189085 A1* | 7/2015 | Riahi | H04M 3/4936 379/265.09 |
| 2015/0373196 A1* | 12/2015 | Scott | H04M 3/42221 704/235 |

OTHER PUBLICATIONS

Personal Information Management, Aug. 10-11, 2016, SIGIR 2006 Workshop, p. 1-121.

Schwartz, Karen D., "Speech Analytics: Effective, but Underused", Jun. 8, 2010, retrieved from <http://www.crmsearch.com/call-center-speech-analytics.php, pp. 1-2.

United States Patent and Trademark Office, Notice of Allowance for U.S. Appl. No. 14/271,347, dated May 5, 2016, 18 pages, U.S.A.

United States Patent and Trademark Office, Notice of Allowance for U.S. Appl. No. 14/271,336, dated Aug. 24, 2017, 20 pages, U.S.A.

United States Patent and Trademark Office, Notice of Allowance for U.S. Appl. No. 14/271,339, dated Jun. 2, 2017, 9 pages, U.S.A.

United States Patent and Trademark Office, Office Action for U.S. Appl. No. 14/271,347, dated Feb. 25, 2016, 7 pages, U.S.A.

United States Patent and Trademark Office, Office Action for U.S. Appl. No. 14/271,336, dated Dec. 7, 2016, 10 pages, U.S.A.

United States Patent and Trademark Office, Office Action for U.S. Appl. No. 14/271,336, dated Mar. 22, 2016, 10 pages, U.S.A.

United States Patent and Trademark Office, Office Action for U.S. Appl. No. 14/271,339, dated Jan. 12, 2017, 10 pages, U.S.A.

United States Patent and Trademark Office, Office Action for U.S. Appl. No. 14/271,339, dated Mar. 6, 2017, 9 pages, U.S.A.

\* cited by examiner

ACCREDITED ADVISOR MANAGEMENT SYSTEM

CROSS-REFERENCES TO RELATED APPLICATIONS

The present application is a continuation of U.S. patent application Ser. No. 14/271,339, filed May 6, 2014, which claims the benefit of the following U.S. Provisional Patent Applications: U.S. Provisional Patent Application No. 61/820,552, filed May 7, 2013, entitled "ADVISING MANAGEMENT SYSTEM;" U.S. Provisional Patent Application No. 61/820,554, filed May 7, 2013, entitled "GAMING ASSISTANCE SYSTEMS AND METHODS;" U.S. Provisional Patent Application No. 61/820,559, filed May 7, 2013, entitled "ACCREDITED ADVISOR MANAGEMENT SYSTEM;" and U.S. Provisional Patent Application No. 61/820,565, filed May 7, 2013, entitled "PLATFORM SHAPE SHIFTER;" the entire disclosures of each of which are hereby incorporated by reference in their entireties.

BACKGROUND OF THE DISCLOSURE

The present disclosure relates in general to advising, and, more specifically, but not by way of limitation, to accredited advisor management systems.

As value, use, access, and demand corresponding to information continue to increase, consumers demand more of the products and services they use than ever before. Companies are expected to compete to provide greater and greater levels of accuracy and more tailored service offerings. Accessing sources of information that have traditionally been unavailable is now expected. There is a need for advising services to provide enhanced access to information.

BRIEF SUMMARY

Certain embodiments of the present disclosure relate generally to systems and methods of facilitating advising, and more particularly to accredited advisor management systems.

In one aspect, an accredited advisor management system is disclosed. One or more network interfaces may be configured to provide access to a network. One or more processors may be coupled to the one or more network interfaces to facilitate communication with an advisor through the network. The one or more processors may execute instructions to perform any one or combination of the following. First information enabling unique identification of a first advisor may be processed. The first advisor may be matched to a first category from a set of categories of advising services, where the first advisor matches one or more categories of the set of categories, and the first category represents a first classification of a first set of advising services sharing a first set of common attributes. Input from the first advisor may be processed based at least in part on the first category, the input including an indication of one or more advising services relating to the first advisor and an indication of one or more credentials of the first advisor. One or more data sources may be selected based at least in part on the first category, the one or more data sources corresponding to one or more accrediting authorities. A set of credential information that came electronically from at least one of the one or more data sources may be processed, the set of credential information relating to the first advisor and including second information about an accreditation attribute corresponding to the first advisor. A first set of advisor information may be consolidated at least partially based on the input from the first advisor and on the set of credential information. A second set of advisor information may be prepared from the first set of advisor information for exposure to advisees. The second set of advisor information may be retained in a repository. An indication of a selection of a user-selectable option may be processed, the indication of the selection coming via the network from an end-user communication device corresponding to a first advisee. Consequent to the indication of the selection, at least part of the second set of advisor information may be retrieved from the repository. At least the part of the second set of advisor information may be transmitted via the network to the end-user communication device. One or more storage media may be coupled to the one or more processors to retain the instructions.

In another aspect, a method for facilitating communication with an advisor is disclosed. The method may include any one or combination of the following. First information enabling unique identification of a first advisor may be processed by a computer system. The first advisor may be matched to a first category from a set of categories of advising services by the computer system, where the first advisor matches one or more categories of the set of categories, and the first category represents a first classification of a first set of advising services sharing a first set of common attributes. Input from the first advisor may be processed by the computer system based at least in part on the first category, the input including an indication of one or more advising services relating to the first advisor and an indication of one or more credentials of the first advisor. One or more data sources may be selected by the computer system based at least in part on the first category, the one or more data sources corresponding to one or more accrediting authorities. A set of credential information that came electronically from at least one of the one or more data sources may be processed by the computer system, the set of credential information relating to the first advisor and including second information about an accreditation attribute corresponding to the first advisor. A first set of advisor information may be consolidated by the computer system at least partially based on the input from the first advisor and on the set of credential information. A second set of advisor information may be prepared from the first set of advisor information for exposure to advisees. The second set of advisor information may be retained by the computer system in a repository. An indication of a selection of a user-selectable option may be processed by the computer system, the indication of the selection coming via the network from an end-user communication device corresponding to a first advisee. Consequent to the indication of the selection, at least part of the second set of advisor information may be retrieved by the computer system from the repository. At least the part of the second set of advisor information may be transmitted by the computer system via the network to the end-user communication device.

In yet another aspect, one or more non-transitory, machine-readable media having machine-readable instructions thereon for facilitating communication with an advisor are disclosed. The instructions, when executed by one or more computers or other processing devices, may cause the one or more computers or other processing devices to perform any one or combination of the following. First information enabling unique identification of a first advisor may be processed. The first advisor may be matched to a first category from a set of categories of advising services, where the first advisor matches one or more categories of the set of categories, and the first category represents a first classification of a first set of advising services sharing a first set of common attributes. Input from the first advisor may be processed based at least in part on the first category, the input including an indication of one or more advising services relating to the first advisor and an indication of one or more credentials of the first advisor. One or more data sources may be selected based at least in part on the first category, the one or more data sources corresponding to one or more accrediting authorities. A set of credential information that came electronically from at least one of the one or more data sources may be processed, the set of credential information relating to the first advisor and including second information about an accreditation attribute corresponding to the first advisor. A first set of advisor information may be consolidated at least partially based on the input from the first advisor and on the set of credential information. A second set of advisor information may be prepared from the first set of advisor information for exposure to advisees. The second set of advisor information may be retained in a repository. An indication of a selection of a user-selectable option may be processed, the indication of the selection coming via the network from an end-user communication device corresponding to a first advisee. Consequent to the indication of the selection, at least part of the second set of advisor information may be retrieved from the repository. At least the part of the second set of advisor information may be transmitted via the network to the end-user communication device.

Various embodiments may include any one or combination of the following, prior to processing an indication of a selection of a user-selectable option. An indication of an interest of the advisee in a first advising service may be processed. The indication of the interest of the advisee in the first advising service may be matched to the first category. Location information about a location corresponding to the advisee may be processed. A third set of advisor information may be processed at least partially based on the advising category and the location, where the third set of advisor information relates to a set of one or more advisors, and the set of one or more advisors includes the advisor. At least the part of the third set of advisor information may be transmitted via the network to the end-user communication device. The indication of the selection of the user-selectable option may be consequent to the transmitting at least the part of the third set of advisor information.

Various embodiments may include any one or combination of the following. Location information about a location corresponding to the advisee processed. The second set of advisor information may include a set of anonymized information. The preparing the second set of advisor information may include generating the set of anonymized information at least partially based on the first set of advisor information and at least partially based on one or both of the first category and the location, the set of anonymized information including a modified set of credential information that includes a portion of the set of credential information. The generating the set of anonymized information may include determining that the set of credential information should be modified with respect to at least a first item of credential information from the set of credential information. Consequent to the determining, the set of credential information may be modified with respect to at least the first item of credential information so that the first item of credential information is either absent from the modified set of credential information or replaced with a second item of credential information that is included in the modified set of credential information. The second item of credential information may correspond to a characterization of the first item of credential information at least partially based on a categorization of the first item of credential information. The transmitting at least the part of the second set of advisor information may include transmitting at least part of the set of anonymized information.

In various embodiments, a communication connection between the advisor and the advisee may be facilitated responsive to a second selection by the advisee. In various embodiments, at least one of the one or more credentials of the first advisor may be verified based at least in part on the set of credential information. In various embodiments, location information about a location corresponding to the advisee processed, and the consolidating the first set of advisor information may be further based at least partially on the location.

Various embodiments may include any one or combination of the following. Third information enabling unique identification of a second advisor may be processed. The second advisor may be matched to a second category from the set of categories of advising services, the second category representing a second classification of a second set of advising services sharing a second set of common attributes. Input from the second advisor may be processed based at least in part on the second category, the input including an indication of one or more advising services relating to the second advisor, and an indication of one or more credentials of the second advisor. One or more data sources may be selected based at least in part on the first category, the first set of one or more data sources corresponding to one or more accrediting authorities. A set of credential information that came electronically from at least one of the one or more data sources may be processed, the set of credential information relating to the first advisor and including fourth information about an accreditation attribute corresponding to the first advisor. A first set of advisor information may be consolidated at least partially based on the input from the first advisor and on the set of credential information. A second set of advisor information may be prepared from the first set of advisor information for exposure to advisees. The second set of advisor information retained. The first category may be different from the second category Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
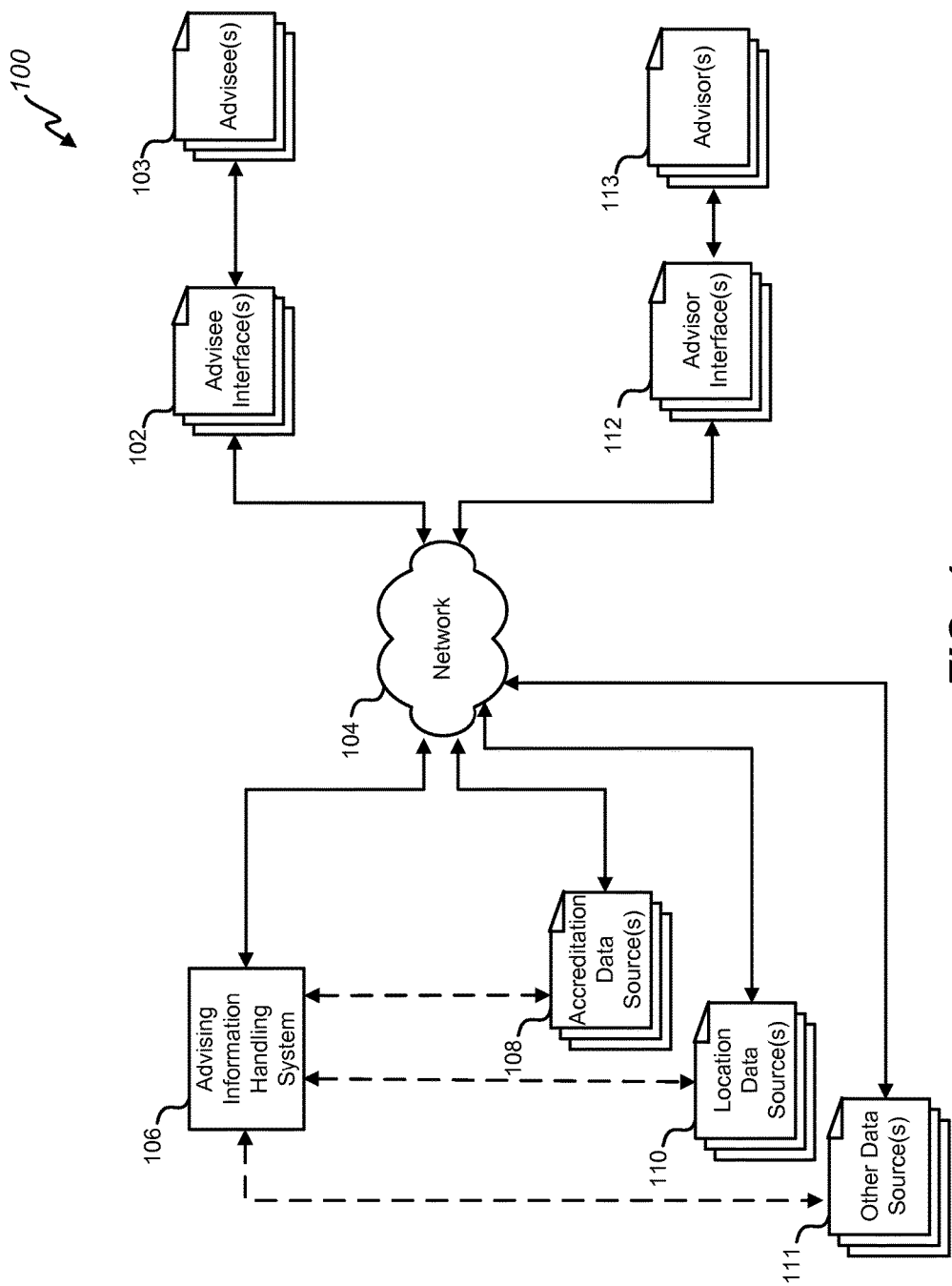
FIG. 1 depicts a high-level block diagram of a system, in accordance with certain embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Certain embodiments according to the present disclosure may provide for an advising platform that facilitates interaction between advisors and advisees. Certain embodiments may provide for a fundamentally new advising experience by anonymizing an advisor, yet facilitate any one or combination of: verifying his/her credentials; exposing credentials to an advisee; verifying insurance; providing insurance; and/or having connections with legal authorities to provide assurances, so that an advisee may avoid difficulties in seeking assistance from an advisor. As used herein, an advisee may include a user who is a current or past advisee, a potential advisee, such as one searching for an advisor, a consumer shopping on behalf of another advisee or potential advisee, and/or the like. Certain embodiments may allow for increased trust and confidence in an advising platform and particular advisors facilitated by the platform. Certain embodiments may allow for coordination of information with legal entities, licensing authorities, certification authorities, and/or the like.

As used herein, an advisor may include an individual or set of multiple individuals who make themselves available to provide advice, assessments, opinions, and/or other information to others, and an advisor may correspond to any one or combination of a service provider, a product provider, a merchant, a business, a representative, a sales person, an advertiser, and/or the like. Various embodiments according to the present disclosure may apply to any licensed, certified, and/or accredited profession, practice area, service area, trade, business, provider, and/or the like. Certain embodiments may apply to therapy providers. Therapy may include any actions directed to attempts to diagnose and/or heal.

Therapy may include medical and/or biotherapy. Therapy may include counseling, such as marriage counseling and/or the like. In many instances, an individual may hold oneself out to the public as a licensed therapist.

A number of different professions, practices, business, trades, providers, services, and/or the like involve licensing/certification requirements or other accreditation from an authority and/or any accreditation-imparting entity which may impart licenses/certifications or other credentials for working in a particular jurisdiction, purview, or other area of concern. For example, a number of different therapy practices involve certifications to practice various therapy methods. Certification could be a prerequisite to becoming a licensed therapist in some cases. However, in certain instances, a license and/or certification may not be required. For instance, a life coach may not need a license to provide life coaching services to individuals in certain jurisdictions. With certain embodiments, advisors requiring credentials may be identified, and one or more accrediting organizations may be checked with respect to a certain advisor to confirm that the advisor possesses the required license(s) and/or certification(s) to practice the particular therapy services. In some embodiments, accrediting organizations may be checked with respect to a certain advisor to determine if and/or confirm that the advisor possess a non-required credential, certificate, degree, and/or license. The platform may present an indication of confirmation/verification to the advisee that the advisor is accredited.

Certain embodiments may provide for tracking of information regarding not only advisors, but also advisees. Tracked information could include information relating to equipment that an advisee uses and/or has used to interface with one or more advisors. For example, information about the specific devices, device configurations, and/or device capabilities that a given advisee uses could be tracked and retained in a repository. As another example, information about particular advisees, such as information relating to biographical data, health conditions, life conditions, problems, advice provided, products purchased by the advisee, services received by the advisee, questions posed by the advisee, feedback/comments/reviews by the advisee, ratings and/or other indicators of approval/disapproval by the advisee, billed information, any suitable facts associated with particular advisees, etc., could be tracked and retained in one or more repositories. Such tracked information for a particular advisee could be made available to an advisor before, during, and/or after an advising session for the advisee. An advising session could be any suitable interfacing between advisor and advisee, for example, via the advising platform. In some embodiments, such advisee-related information could be provided by the advisee, the advisor, and/or via automatic detection by the system. For each advisee, a dossier could be compiled and made available to an advisor to facilitate advising the advisee.

In various embodiments, the advising platform may track calls, messages, billing, etc., and enable advisors to interact with the platform to retrieve, see, and use the data. A feed of information and/or a dashboard could be in a web portal and/or provided via a mobile application. The advisor could customize the dashboard and/or the feeds and can, for example, identify portions of the dashboard and/or feeds that can be ignored. In some embodiments, for example, default templates may be supplied.

In some embodiments, an advisor and/or an advisee may use a computing device executing an application module (an "app") via which the computing device may communicate via the advising platform. An advisor and/or an advisee could download an app to his or her computing device that can function to facilitate advising sessions. With certain embodiments, a mobile app may be made available for execution on an advisor's/advisee's computing device, which could be a mobile computing device (such as a smartphone, tablet, and/or the like), to provide various features described herein. Various embodiments may include a specific purpose-based mobile app or a mobile app integrated with various other mobile application features.

Various embodiments may provide for advisee data collection and/or representation through different media. In some embodiments, certain advisee information could be provided automatically by the advisee's computing device to the advising information handling system. Certain embodiments may automatically detect an advisee's location and present location information to an advisor. Certain embodiments may analyze inputs coming from individual media and capture related information, which inputs and related information could be retained in an advisee profile such that the profile could be retrievable for later sessions with the advisee. For example, the advisor may capture information about an advisee's facial expressions, which information may include micro-expressions, voice, speaking, body language, gestures, emotional indicia, writing, environmental context, and/or the like.

Various embodiments will now be discussed in greater detail with reference to the accompanying figures, beginning with FIG. 1.

FIG. 1 depicts a high-level block diagram of a system 100, in accordance with certain embodiments of the present disclosure. The system 100 allows for interaction between two or more of advisee interface(s) 102, advisee(s) 103, advisor interface(s) 112, advisor(s) 113, an advising information handling system 106, accreditation data source(s) 108, and/or location data source(s) 110. As depicted, various elements of the system 100 may be communicatively coupled or couplable to a network 104.

The network 104 may be any suitable means to facilitate data transfer in the system 100 and could include multiple networks and/or network components. In various embodiments, the network 104 may be implemented with, without limitation, one or more of the Internet, a wide area network (WAN), a local area network (LAN), a wireless local area network (WLAN), a metropolitan area network (MAN), a cellular network, such as through 4G, 3G, GSM, etc., another wireless network, a gateway, a conventional telephone network, or any other appropriate architecture or system that facilitates the communication of signals, data, and/or message. The network 104 may transmit data using any suitable communication protocol. The network 104 and its various components may be implemented using hardware, software, and communications media such as wires, optical fibers, microwaves, radio waves, and other electromagnetic and/or optical carriers; and/or any combination of the foregoing. The advisee interface(s) 102, advisee(s) 103, advisor interface(s) 112, advisor(s) 113, an advising information handling system 106, and/or accreditation data source(s) 108 may be communicatively coupled or couplable to the network 104 via any suitable communication paths that support the communication protocol(s) used in the various embodiments.

The advising information handling system 106 may facilitate searching of one or more information repositories in response to information received over the network 104 from the advisee interfaces 102 and/or advisor interfaces 112. In various embodiments, the advising information handling system 106 may include any device or set of devices configured to process, send, receive, retrieve, detect, generate, compute, organize, categorize, qualify, store, display, present, handle, or use any form of information and/or data suitable for the embodiments described herein.

The advising information handling system 106 may include a single computing device or multiple computing devices, which, in some embodiments, may be implemented in or with a distributed computing and/or cloud computing environment. The advising information handling system 106 may include one or more processing resources communicatively coupled to one or more storage media, random access memory (RAM), read-only memory (ROM), and/or other types of memory. The advising information handling system 106 may include any one or combination of various input and output (I/O) devices, network ports, and display devices.

In certain embodiments, the advising information handling system 106 may be communicatively coupled or couplable to one or more accreditation data sources 108. The one or more accreditation data sources 108 may include any suitable source of data. In various embodiments, the one or more accreditation data sources 108 may include one or more of a database, a website, any repository of data in any suitable form, and/or a third party. In various embodiments, the accreditation data sources 108 may include any entity, organization, institution, and/or authority that provides for, administers, examines, oversees, issues, reviews, authorizes, regulates, investigates, maintains, recommends, and/or otherwise deals with licensing, certification, permits, and/or other accreditation related to any profession, business, position, practice, and/or service. The one or more accreditation data sources 108 may retain and/or have access to data relating to licensing, certification, permits, and/or other accreditation related to any profession, business, trade, provider, position, practice, and/or service, and may be one or more sources of such information. One or more accreditation data sources 108 may have web site/portals giving access to such information, for example, a portal that can be tapped to gather information.

In certain embodiments, the advising information handling system 106 may be communicatively coupled or couplable to one or more location data sources 110. With some embodiments, the one or more location data sources 110 may include one or more mobile computing device locator services that provide information regarding the location of one or more advisee interfaces 102. With some embodiments, the location data sources 110 may provide various details relating to call data. With some embodiments, the location data sources 110 may provide caller name information from calling name delivery (CNAM), also known as caller identification or caller ID, which information may be used to determine particular details about the caller. With some embodiments, the location data sources 110 may provide information about the area from which a caller is located. With some embodiments, the accreditation data sources 108 may provide demographic data about an area.

In certain embodiments, the advising information handling system 106 may be communicatively coupled or couplable to one or more other data sources 111. The one or more data sources 111 may include any suitable source of data. In various embodiments, the one or more data sources 111 may include one or more of a database, a website, any repository of data in any suitable form, and/or a third party. In various embodiments, the one or more data sources 111 may facilitate at least in part a background check process of an advisor, such as for an advisor onboarding process described further herein. A background check process may include one or more of criminal record checks, identity validation, e.g., via social security numbers, sex offender background checks, insurance validation, and/or the like. A background check process could be performed at least in part by a third party, such a data source 111, in some embodiments.

One or more of the data sources 108, 110, and/or 111 may be linked to the advising information handling system 106 via the network 104 or directly so that information retained by the data source(s) 108, 110, and/or 111 may be accessed by/transferred to the advising information handling system. One or more of the data sources 108, 110, and/or 111 may include any suitable input/output module or other system/device operable to serve as an interface between the data source(s) 108, 110, and/or 111 and the network 104 and/or advising information handling system 106. The interface may facilitate communication over the network 104 using any suitable transmission protocol, standard, and/or encryption. In some embodiments, the advising information handling system 106 may include and/or provide the interface, for example, by making available one or more of an application programming interface(s) (API(s)), a website, a web page, a web portal, a web application, a mobile application, enterprise software, and/or any suitable application software. In some embodiments, one or more of the data sources 108, 110, and/or 111 may be a part of the advising information handling system 106.

In various embodiments, the data from one or more of the data sources 108, 110, and/or 111 may be retrieved and/or received by the advising information handling system 106 via the network 104, API calls, and/or through any other suitable means of transferring data. For example, in some embodiments, the advising information handling system 106 and one or more of the data sources 108, 110, and/or 111 could use any suitable means for direct communication. According to certain embodiments, data may be actively gathered and/or pulled from one or more of the data sources 108, 110, and/or 111, for example, by accessing a third party repository and/or by "crawling" various repositories. With some embodiments, certain of the data pulled and/or pushed from one or more of the data sources 108, 110, and/or 111 may be made available by the advising information handling system 106 for user(s) of the advisee interfaces 102 and/or advisor interfaces 112.

The advisee interfaces 102 and/or advisor interfaces 112 may allow for transfer of and/or access to information in accordance with certain embodiments disclosed herein. In various embodiments, the advisee interface(s) 102 and/or advisor interface(s) 112 may include any suitable input/output module or other system/device operable to serve as an interface between advisors 113, advisees 103, and/or the advising platform. The advisee interfaces 102 and/or advisor interfaces 112 may facilitate communication over the network 104 using any suitable transmission protocol and/or standard. In various embodiments, the advising information handling system 106 may include, provide, and/or be configured for operation with the advisee interfaces 102 and/or advisor interfaces 112, for example, by making available and/or communicating with one or more of a website, a web page, a web portal, a web application, a mobile application, enterprise software, and/or any suitable application software. In some embodiments, an advisee interface 102 and/or advisor interface 112 may include one or more APIs.

In some embodiments, an advisee interface 102 and/or an advisor interface 112 may include a web interface. In some embodiments, the advisee interface 102 and/or advisor interface 112 may include or work with an application made available to one or more interfaces, such as a mobile application. In some embodiments, the advisee interface 102 and/or advisor interface 112 may cause a web page to be displayed on a browser of an advisor 113. The web page(s) may display output and receive input from a user (e.g., by using Web-based forms, via hyperlinks, electronic buttons, etc.). A variety of techniques can be used to create the web pages and/or display/receive information, such as JavaScript, Java applications or applets, dynamic HTML and/or AJAX technologies. Accordingly, the advising information handling system 106 may have web site/portals giving access to such information, such as a service provider portal.

In various embodiments, an advisee interface 102 and/or an advisor interface 112 may include providing one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like.

In certain embodiments, an advisee interface 102 and/or an advisor interface 112 may include a computing device of an advisee 103 and/or an advisor 113. In certain embodiments, an advisee interface 102 and/or an advisor interface 112 may include a mobile computing device that may be any portable device suitable for sending and receiving information over a network in accordance with embodiments described herein. In one non-limiting exemplary embodiment, the computing device may include one or more devices variously referenced as a desktop computer, mobile phone, a cellular telephone, a smartphone, a handheld mobile device, a tablet computer, a web pad, a personal digital assistant (PDA), a notebook computer, a handheld computer, a laptop computer, and/or the like. Some embodiments include a landline phone that may not be a computing device.

In some embodiments, the advising information handling system 106 may provide for the selection and provision of advertisements to one or more of advisee interfaces 102, and/or advisees 103. In certain embodiments, one or more advisors 113 may have advertisements that may be placed in a web page made available to one or more advisee interfaces 102. In certain embodiments, one or more advisors 113 may have advertisements that may be displayed with an application made available to one or more advisee interfaces 102, such as a mobile application. The placement of the advertisements may be in accordance with one or more paid placement arrangements and one or more advertising models.

In some embodiments, advisors 113 and advisees 103 may communicate via Voice Over Internet Protocol (VoIP) technology with their respective interfaces. An advisee 103 and an advisor 113 may, in some embodiments, be communicatively coupled through switches of the network 104, which may include switches of a public telephone network, switches of the advising information handling system 106, and/or the like. In some embodiments, one or more advisors 113 could be contacted by an advisee 103 and/or the advising information handling system 106 via various media channels, such as email, chat, instant message, etc., and an advisor 113 could respond via various media channels including, for example, the above listed various media channels. Communication between advisors 113 and advisees 103 may be established via telephonic connection, chat connection, game voice chat, private chat, video chat, videoconferencing, videophone calls, web conferencing, and/or the like.

Figure 2:
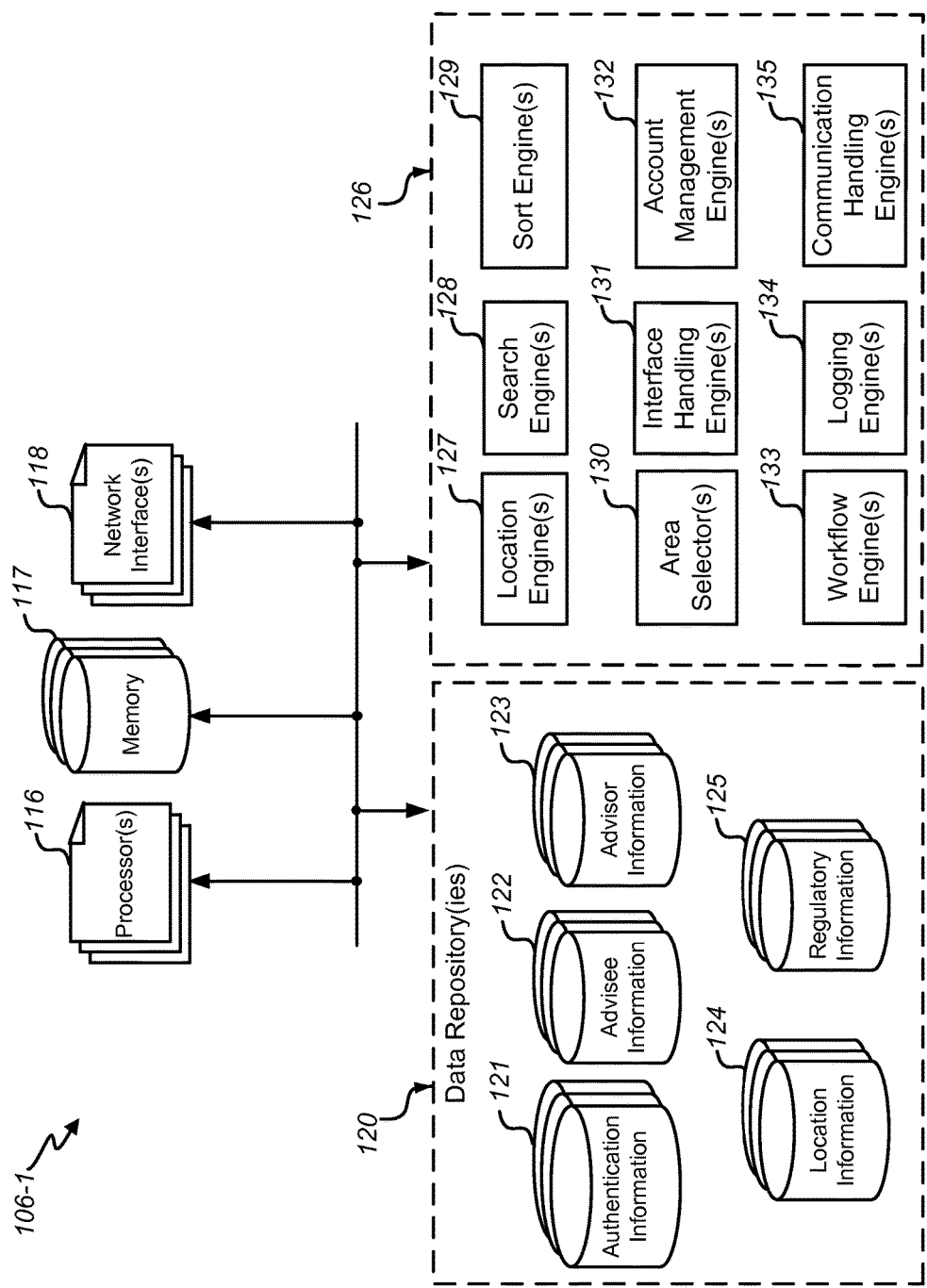
FIG. 2 shows a high-level block diagram of an advising information handling system, in accordance with certain embodiments of the present disclosure.

FIG. 2 shows a high-level block diagram of an advising information handling system 106-1, in accordance with certain embodiments of the present disclosure. The system 106-1 may correspond to the system 106 of FIG. 1, with one embodiment of the advising information handling system 106-1 being shown in more detail. While engines, repositories, and other components are described separately herein, it should be appreciated that the components may be combined and/or implemented differently in any combination to provide certain features in various embodiments. In various embodiments, different processes running on one or more shared computers may implement some of the components.

The advising information handling system 106-1 may include one or more servers. The one or more servers may include one or more network interfaces 118 communicatively coupled to processors 116. The network interface(s) 118 may include any suitable input/output module or other system/device operable to serve as an interface between one or more components of the service information handling system 106-1 and the network 104. The advising information handling system 106-1 may use the network interfaces 118 to communicate over the network 104 using any suitable transmission protocol and/or standard. In some embodiments, the one or more servers may include one or more web servers, one or more email gateways, one or more instant messaging gateways, one or more telephone gateways, one or more other gateways, such as television gateways, and/or one or more other types of servers, such as an application gateway to interface with different servers. Some embodiments may use one type of communication server, such as a web server, to receive search requests and another type of communication server to provide the search results. Some embodiments may use different types of communication servers to service different types of interfaces 102, 112.

Certain embodiments may provide a multi-channel communication regime to coordinate multiple communication channels used by consumers and service providers. Multiple communication pipes within a communication pipe could be implemented according to certain embodiments. Some embodiments may implement a greater number of communication channels. For example, one set of channels could be used for a consumer to request help, and one set of channels could be used for a service provider to respond to the consumer. The system can use web communication, text communication, voice communication, e-mail communication, push notification, and/or the like.

In some embodiments, a server may communicate with a computing device 102 via HyperText Transfer Protocol (HTTP) and/or other types of communication protocols, such as File Transfer Protocol (FTP), Wireless Application Protocol (WAP), etc. A web server may provide static web pages, dynamic web pages, and/or web services. In some embodiments, a web server may provide web applications to a computing device 102 for execution in a web browser running on the computing device 102, 112; and the web applications may include scripts for execution within an isolated environment in a browser. In some embodiments, the web server may provide rich-client applications to a computing device 102, 112; and the rich-client application may be programmed to have access to functions of the operating system running on a computing device 102, 112.

The advising information handling system 106-1 may include one or more data repositories 120. In various embodiments, the data repository(ies) 120 may be implemented in various ways. For example, one or more data processing systems may store information. One or more relational or object-oriented databases, or flat files on one or more computers or networked storage devices, may store information. In some embodiments, a centralized system stores information; alternatively, a distributed/cloud system, network-based system, such as being implemented with a peer-to-peer network, or Internet, may store information.

In some embodiments, the one or more data repositories 120 may include one or more authentication information repositories 121. The one or more authentication information repositories 121 may retain any authentication information suitable to facilitate security for embodiments of this disclosure. The authentication information repositories 121 may include database(s), database management system(s), server(s) to facilitate management/provision/transfer of authentication information, and/or the like. The repositories 121 may retain authentication information of one or more particular advisees 103, advisors 113, and/or other data sources 108, 110, 111. The authentication information may include information to check credentials of particular advisees 103, advisors 113, and/or other data sources 108, 110, 111 that may use one of their corresponding interfaces to seek access, transfer information, and/or make service-related transactions with advising information handling system 106. The authentication information may be used to provide security for transactions, restrict the access granted to a certain set of information and/or features, implement certain control and/or features for certain parties, and/or the like.

In some embodiments, the one or more data repositories 120 may include one or more advisee information repositories 122. The advisee information may be associated with the corresponding advisees 103. In some embodiments, an advisee 103 may create corresponding advisee information. In some embodiments, a computing device 102, 112 may store advisee information. In some embodiments, both the computing device 102, 112 and the online advisee data repository(ies) 122 may store the advisee information for a particular advisee 103. In some embodiments, when there is a data communication connection between the computing device 102, 112 and the online advisee data repository(ies) 122, the computing device 102, 112 and the online advisee data repository(ies) 122 may synchronize their copies of the advisee information for the advisee 103.

In some embodiments, the one or more data repositories 120 may include one or more advisor information repositories 123. The one or more advisor information repositories 123 may retain advisor information of particular advisors. The repositories 123 may retain any information related to advisors. For example, one or more advisor information repositories 123 may retain any information related to any one or combination of advisor identification information, advisor profiles, advisor certification information, advisor licensing information, advisor permit information, advisor pricing information, advisor authentication information, advisor statuses, advisor relationships, organization details, payment methods, accounting information, credit information, asset information, collateral information, address information, contact information, user account information, advertisements, announcements, and/or the like. The advisor information 123 may be associated with location information 124, which may have street addresses or other location parameters, such as longitude and latitude coordinates, stored as locations in one or more location information repositories 124. The location information 124 may be part of the advisor information 123, or associated therewith.

In some embodiments, the one or more data repositories 120 may include one or more regulatory information repositories 125. The regulatory information repositories 125 may retain any suitable information related to certification, licensing, permits, and/or other accreditation information. The information may include rules for professions, businesses, trades, providers, positions, practices, and/or services, associated with certification, licensing, permit, and/or other accreditation requirements and/or criteria and accreditation data sources 108, and associated with various jurisdictions.

One or more engines 126 may be used to process a search request and present search results based on the information stored in one or more data repositories 120. The one or more data repositories 120 may include listings information about business entities or public end-user information, or other types of searchable end-user information. The one or more listings information repositories may retain any local listings information suitable for embodiments of this disclosure, such as business, product, and service information. In certain embodiments, the local listings information may correspond to directory information of the kind available via Yellow Pages services and the like.

In various embodiments, one or more of the engines 126 and/or other modules, such as a voice recognition system, may be stored in the one or more memories and may include one or more software applications, executable with the processors, for receiving and processing data requests. In some embodiments, one or more of the engines 126 and/or other modules, may be servers communicating with the communication server(s). The server communication may be over a network, such as a local area network, a wide area network, an intranet, Internet, and/or the like. Any one or combination of the various servers may run on common or separate computers. In some embodiments, there may be one or more layers of application servers between the communication server and the data repository(ies) 120 to process the business logic and data access of the rich client applications. Alternatively, application servers may be integrated with the communication servers, such as the web servers. Certain embodiments are not limited to a particular type of connections among the communication servers, one or more of the engines 126 and/or other modules.

In some embodiments, one computer system implements one or more of the components of the system 106. Alternatively, different processes running on one or more shared computers may implement some of the components. For example, one computing module, thread, or process may implement multiple of the components. In some embodiments, special purpose data processing systems implement the one or more of the components. In some embodiments, processes running according to software instructions on general purpose data processing systems, such as general purpose personal computers or server computers, can implement the components. Thus, the implementations are not limited to particular hardware, software, or particular combinations of hardware and software.

In some embodiments, the location engine(s) 127 may include one or more engines and may use GPS coordinates, cellular tower triangulation techniques, Wi-Fi-based location information, carrier-provided location information, and/or other location determination systems to identify a location of the computing device 102. In some embodiments, the location engine 127 determines a location of interest to the advisee 103 related to a search request. The location of interest may be based on a location of the computing device 102. In some embodiments, the advisee 103 may explicitly specify the location of interest in a search request; and the location engine 127 extracts the location of interest from the search request. In some embodiments, a location of interest may be based on end-user information stored for a particular advisee 103 and associated with identification information of the advisee 103 or the computing device 102. In some embodiments, the advisee 103 may specify some or all of the end-user information.

In some embodiments, the location engine 127 may automatically identify the location of interest based on the current location of the computing device 102 used to submit a search request and/or initiate a phone call. For example, the location engine 127 may determine the location of the computing device 102 based on a connection point the computing device 102 used to access the network 104 (e.g., based on the location of a wireless network access point, a base station of a cellular communication system, or a connection point to a wired network). In some embodiments, the computing device 102 automatically determines its current position (e.g., via a satellite positioning system, or a cellular positioning system) and can transmit the determined or estimated position to the system 106 with the search request, or provides the position in response to a request from the location engine 127.

In some embodiments, the search engine 128 may retrieve information from the data repository(ies) 120 according to a search request. The search engine 128 may include logic for implementing searching of one or more information repositories. Other engines 126 may include and/or utilize the search engine 128 in various embodiments. The searching may be in response to information received over the network 104 from a user. Responsive to a query, the search engine 128 may search, retrieve, modify, and/or cause transfer of particular information from one or more information repositories.

A sort engine 129 may rank the information in accordance with embodiments discussed herein. In various embodiments, the area selector 130 may be configured to select areas of interest in accordance with various embodiments described herein. In some embodiments, the area selector 130 may select a first geographic area based on the location of interest identified by the location engine 127. The search engine 128 may then retrieve a first set of advisor information that have corresponding locations within the selected first geographic area and that satisfies the search criteria. In some embodiments, the search engine 128 may search for advisor information in a target area to obtain a set of search results; the area selector 130 may select geographic areas and may select groups of results that are within the selected geographic areas respectively.

In some embodiments, the interface handling engine(s) 131 may include logic to send, present, and receive information, with one or more of the interfaces to/from one or more advisees, advisors, and/or data sources. The interface handling engine(s) 131, with one or more the processors 116, may utilize one or more network interfaces 118 to transceive information through the network 104. The system 106 may pull and/or push information from those entities in any suitable way.

In some embodiments, the account management engine(s) 132 may include logic for implementing account features in various embodiments. By way of example without limitation, the account management engine(s) 132 may include logic for one or more aspects of: handling user registration; managing account creation, updates, authentication, handling; handling buyer deposit accounts; handling buyer credit accounts; and/or the like. The account management engine(s) 132 may be configured for acquiring, processing, formatting, and/or storing authentication information in the one or more authentication repositories 121.

In some embodiments, the service management workflow engine(s) 133 may include logic for implementing service management workflow features in various embodiments. By way of example without limitation, the service management workflow engine(s) 133 may include logic for one or more aspects of: creating, changing, and storing advisee and advisor profiles; presenting and handling advisor options; handling advisee requests; and/or the like. Some embodiments may include a notification engine (not shown). In some embodiments, notification engine(s) may include logic for implementing notification features in various embodiments. By way of example without limitation, the notification engine(s) may include logic for one or more aspects of: generating and sending notifications to platform users; receiving responses from platform users; coordinating responses and extracting pertinent information therefrom; alerting consumers and advisors regarding events of interest; and/or the like. The notification engine(s) may be configured to check consumer and/or advisor notification profiles for handling notifications in accordance therewith. In some embodiments, the service management workflow engine(s) 133 may include the notification engine(s).

In some embodiments, the logging engine(s) 134 may include logic for implementing information logging features in various embodiments. By way of example without limitation, the logging engine(s) 134 could process data pulled and/or pushed from various entities. The logging engine(s) 134 could handle process, extracting, formatting, and/or storing data may in one or more of the aforementioned repositories. In some embodiments, the communication handling engine(s) 135 may be configured to one or more of decode, route, and redirect calls from advisees to advisors. Aspects of the communication handling module(s) 135 are further discussed herein.

Figure 3:
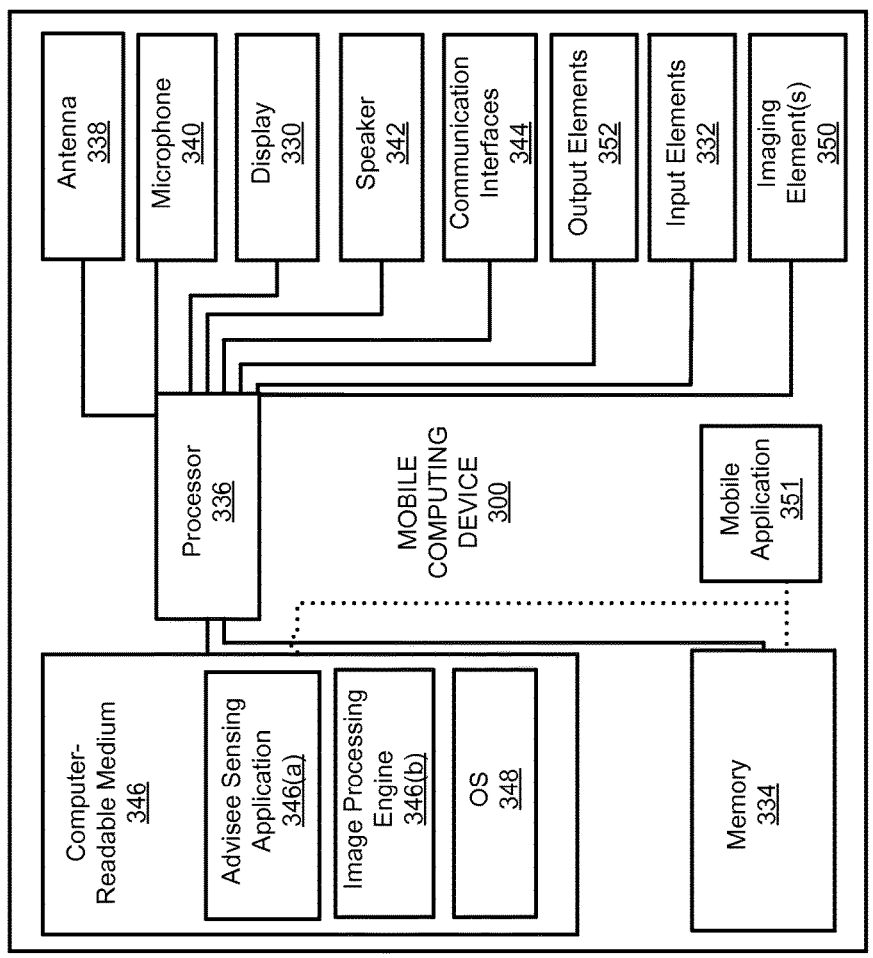
FIG. 3 depicts a functional block diagram of a computing device, in accordance with certain embodiments of the present disclosure.

FIG. 3 is a functional block diagram of a computing device 300, which may correspond to one or more of interfaces 102 and/or 112, according to certain embodiments of the present disclosure. In some embodiments, the computing device 300 may be mobile computing device. In some embodiments, the computing device 300 may be provided with a mobile application 351 configured to run on the computing device 300 to facilitate various embodiments of this disclosure. The computing device 300 may be any portable device suitable for sending and receiving information over a network in accordance with embodiments described herein. For example without limitation, in various embodiments, the computing device 300 may include one or more of a mobile phone, a cellular telephone, a smartphone, a handheld mobile device, a tablet computer, a web pad, a personal digital assistant (PDA), a notebook computer, a handheld computer, a laptop computer, a vehicle computer, or the like.

As shown in FIG. 3, the computing device 300 includes a display 330 and input elements 332 to allow a user to input information into the computing device 300. By way of example without limitation, the input elements 332 may include one or more of a keypad, a trackball, a touchscreen, a touchpad, a pointing device, a microphone, a voice recognition device, or any other appropriate mechanism for the user to provide input. The display 330 may include a resistive or capacitive screen. The display 330 may be configured for stylus sensitivity which allows movement of the stylus on the screen to be detected. The touch-screen capability may be achieved via an electronic position location system capable of determining a location of a selected region of the display screen. A commercially available electronic position location system like the ones that are used in many commercially available devices such as personal digital assistants, tablet PCs, and smartphones, may be used. An exemplary system may comprise a glass or plastic plate with a metallic coating facing a metallic coating on an underside of a layer of Mylar™ above the glass or plastic plate. Pressing the screen with the stylus brings the plate and the Mylar™ layer in contact with each other so that an electrical current flows through them. By measuring the electrical current from two sides of the display screen, a computer program then determines the vertical and horizontal position of the stylus. By sampling contact locations at a predetermined rate, such as, 100 times a second or faster, the display screen can detect the position of the stylus. In other examples, there can be a grid of wires under the display screen that can be activated after interaction with the stylus. The x-y position can be determined with a processor inside the apparatus.

The input elements 332 may include one or more of: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like. The input elements 332 may include a set of one or more of the following physiological sensors: bioimpedance, respiration, respiration rate variability, heart rate (average, minimum, maximum), heart rhythm, heart rate variability, respiratory sounds, blood pressure, activity, posture, and/or temperature/heat flux. The input elements 332 may include an activity sensor that may be one or more of the following: a ball switch, an accelerometer, a heart rate sensor, a bioimpedance noise sensor, a skin temperature/heat flux sensor, a blood pressure sensor, a muscle noise sensor, and/or a posture sensor. In some embodiments, heart rate or other physiological aspects may be detected in conjunction with the flash of the camera. For example, an advisee could place his finger over the flash so that heart rate may be detected.

The computing device 300 includes a memory 334 communicatively coupled to a processor 336 (e.g., a microprocessor) for processing the functions of the computing device 300. The computing device 300 may include at least one antenna 338 for wireless data transfer.

The computing device 300 may also include a microphone 340 to allow a user to transmit voice communication through the computing device 300, and a speaker 342 to allow the user to hear voice communication, music, etc. In addition, the computing device 300 may include one or more interfaces in addition to the antenna 338, e.g., a wireless interface coupled to an antenna. The communications interfaces 344 can provide a near field communication interface (e.g., contactless interface, Bluetooth, optical interface, etc.) and/or wireless communications interfaces capable of communicating through a cellular network, such as GSM, or through Wi-Fi, such as with a wireless local area network (WLAN). Accordingly, the computing device 300 may be capable of transmitting and receiving information wirelessly through both short range, radio frequency (RF) and cellular and Wi-Fi connections.

Additionally, the computing device 300 can be capable of communicating with a Global Positioning System (GPS) in order to determine the location of the computing device 300. In the embodiment shown in FIG. 3, the antenna 338 may include a cellular antenna (e.g., for sending and receiving cellular voice and data communication, such as through a network such as a 3G or 4G network), and interfaces 344 may include one or more local communication interfaces. The antenna 338 may include GPS receiver functionality. In other embodiments contemplated herein, communication with the computing device 300 may be conducted with a single antenna configured for multiple purposes (e.g., cellular, transactions, GPS, etc.), or with further interfaces (e.g., three, four, or more separate interfaces).

The computing device 300 can also include at least one computer-readable medium 346 coupled to the processor 336, which stores application programs and other computer code instructions for operating the device, such as an operating system (OS) 348. The mobile application 351 may be stored in the memory 334 and/or computer-readable media 346. The computer-readable medium 346 can include a sensing application to gather and/or process any suitable information regarding the advisee in accordance with various embodiments, including, for example, data gathered from sensors of the computing device 300. In certain embodiments, the sensing application 346(a) can automatically run each time that a user accesses the mobile application 351. In some embodiments, the sensing application 346(a) can run continuously (e.g., in the background) or at other times, such as when the mobile application 351 is initiated by a user. With some embodiments, the sensing application 346(a) is separate from the mobile application 351. In other embodiments, the mobile application 351 may include the sensing application 346(a). In some embodiments, the mobile application 351 and/or the sensing application 346(a) can include a customizable user interface (UI), which can be determined by the user's preferences through application-level programming.

The computer-readable medium 346 can also include an image-processing engine 346(b). The image-processing engine 346(b) can capture an image and compress the image in a format readable by a central processing server.

The computing device 300 can additionally include one or more imaging elements 350, such as an integrated camera, capable of capturing images and/or video, and output elements 352. In certain embodiments, the computing device 300 may include a non-transitory computer-readable storage medium, e.g., memory 334, for storing images captured with the one or more imaging elements 350. In alternative embodiments, the computing device 300 receives image data from an image capture device that is not integrated with the computing device 300 and stores those images on the aforementioned non-transitory storage medium.

In some embodiments, image information is captured using at least one imaging element computing device. In some embodiments, the image information includes image information for at least a portion of a user of the computing device. The image information in some embodiments includes a brightness level of an area around the electronic device. In some embodiments, the image information may include video and/or still images. The one or more imaging elements 350 may include one or more IR sensors, cameras, iris detectors, heat sensors, ambient light sensor, or other image capturing technology for capturing the image information. In some embodiments, computing device 300 may use one or a combination of different imaging elements to capture the image information. Some embodiments may capture the image information continuously or periodically (e.g., every few seconds).

The display screen of some embodiments displays information to the viewer facing the display screen (e.g., on the same side of the computing device as the display screen). The computing device in this example can include one or more imaging elements, in this example including image capture elements on the front of the device and image capture elements on the back of the device. It should be understood, however, that image capture elements could also, or alternatively, be placed on the sides or corners of the device, and that there can be any appropriate number of capture elements of similar or different types. The imaging elements also can be of similar or different types.

In some embodiments, one or more IR detectors may be able to capture the infrared radiation that is reflected back from a surface, such as a viewer's retinas, in a direction that is substantially orthogonal and/or at other angles to the capture plane of the detector. In some embodiments, a computing device may utilize one or more IR emitters (e.g., IR light emitting diodes (LEDs), IR laser diodes, or other such components), to illuminate an advisee's face, with light, including the light that is then reflected light and captured by a IR sensor.

In some embodiments, the platform may provide a graphical user interface, and may display images that may include one or more selectable items included in the graphical user interface. An input device may be movable in free space and may be configured to point to the selectable items. In some examples, an input device such as a stylus, a pen, finger contact, etc. may be used to write or mark-up the image, by for example making notations, or sketching, or the like on the displayed image. In some embodiments, the platform may provide a graphical user interface with a whiteboard feature, allowing an advisor and/or advisee to write or draw on the whiteboard.

Figure 4:
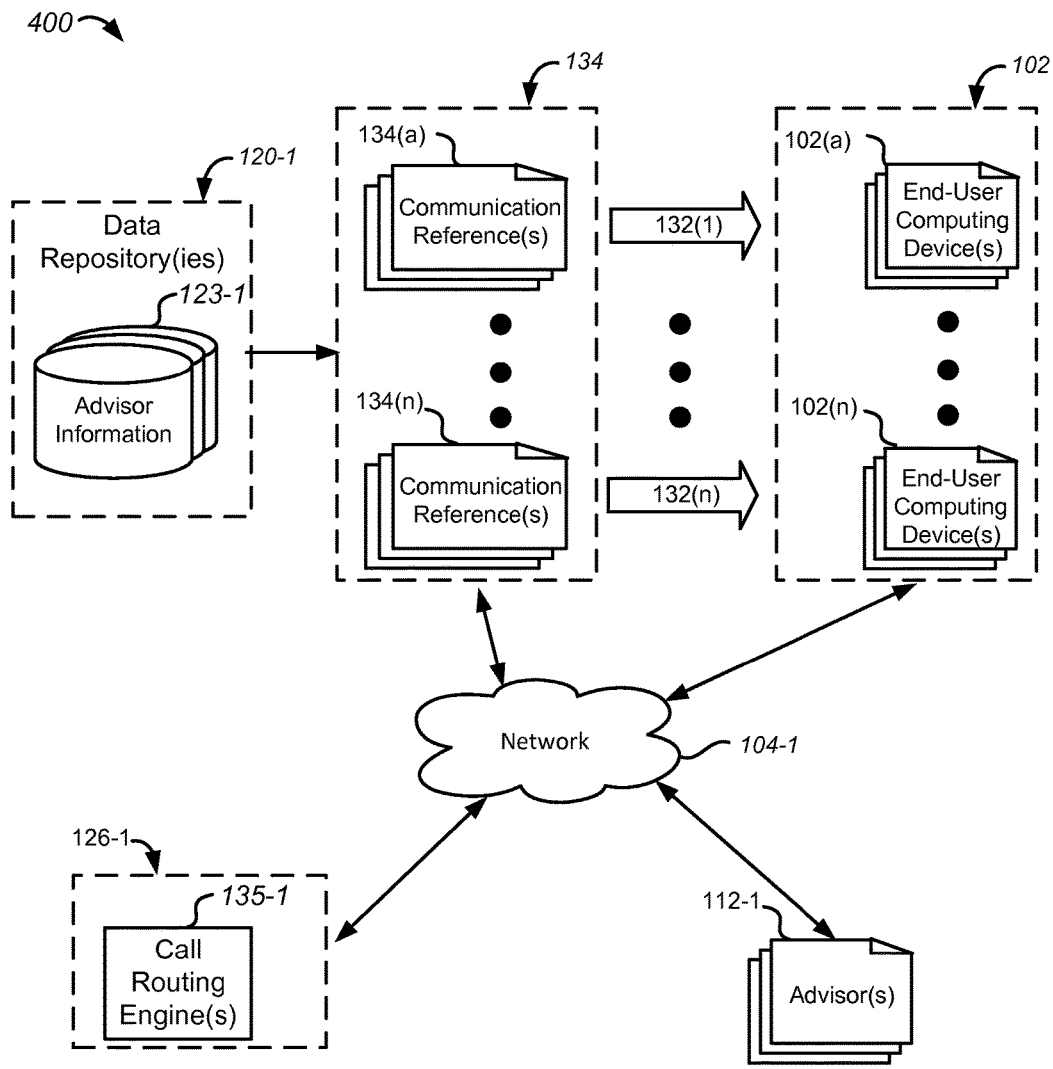
FIG. 4 shows a diagram of a system for call handling, in accordance with certain embodiments of the present disclosure.

FIG. 4 shows a diagram of a system 400 for call handling, in accordance with certain embodiments of the present disclosure. The system 400 may correspond to certain embodiments addressed with respect to other figures herein. The system 400 may include one or more data repositories 120-1. In some embodiments, the one or more data repositories 120-1 may include one or more advisor information repositories 123-1. In some embodiments, the advisor information repositories 123-1 may correspond to the advisor information repositories of FIG. 2. The advisor information repository 123-1 may contain phone numbers of target phones. Typically, the target phones belong to advertisers, which may correspond to one or more of institutions, businesses, individuals, etc. that seek publicity through various media channels 132, such as web servers, WAP servers, short messaging services, etc., which may or may not use the network 104-1.

In some embodiments, communication references 134 may be provided to the end-user computing devices 102. The communication references 134 may allow routing of calls from end-user devices at least partially based on location in accordance with certain embodiments of this disclosure. In various embodiments, the communication references 134 may be delivered with content information (e.g., web page, WAP page, short message, television programs, news articles, etc.) to end-user computing devices 102. In some embodiments, a communication reference 134 may be a phone number. The phone number may correspond to a set of advertisers. The phone number could indicate a category of advertisers. In some embodiments, a communication reference 134 may facilitate a click-to-call feature. In some embodiments, communication reference 134 may be an encoded target phone number. Encoded target phone numbers may allow the association of additional information with the target phone numbers, such as the media channels used, special promotions, etc.

In embodiments where an end-user computing device 102 is a mobile device, content information, including advertisements, may be transferred to the device through wireless communication connections, such as cellular communication links, wireless access points for wireless local area network, etc. In some embodiments, an end-user computing device 102 can receive content information from multiple types of media channels 132 (e.g., a web server, a WAP server, a SMSC, etc.). In some embodiments, an end-user computing device 102 may be able to initiate a phone call (e.g., automatically dialing according to the encoded phone number embedded in the content information when a user selects the number). Alternatively, a user may dial a phone call using another phone, separate from the end-user computing device 102.

In some embodiments, dialing at least a portion of a phone number corresponding to a communication reference 134 may connect the phone call to a communication handling module 135-1. The communication handling engine 135 may include one or more call routing engines 135-1. The call routing engine 135-1 may include one or both of a router and a decoder. In some embodiments, based at least partially on the communication reference selected, such as a phone number dialed and/or a call button selected, the call routing engine 135-1 may determine one or more corresponding target communication references using the advisor information repository 123-1 and may connect the phone call to one or more target advisors 112-1 through the network 104-1.

The network 104-1 may correspond to the network 104 in some embodiments. In some embodiments, the network 104-1 can be and/or can include a telephone network. In some embodiments, a telephone network 104-1 may overlap at least a portion of the network 104. The telephone network 104-1 may be circuit switched, package switched, or partially circuit switched and partially package switched. For example, the telephone network may partially use the Internet to carry the phone call (e.g., through VoIP). For example, a connection between an end-user device 102 and the call routing engine 135-1 may be carried using VoIP; and the connection between a router and a decoder of the call routing engine 135-1 may be carried using a land-line based, circuit-switched telephone network.

Figure 5:
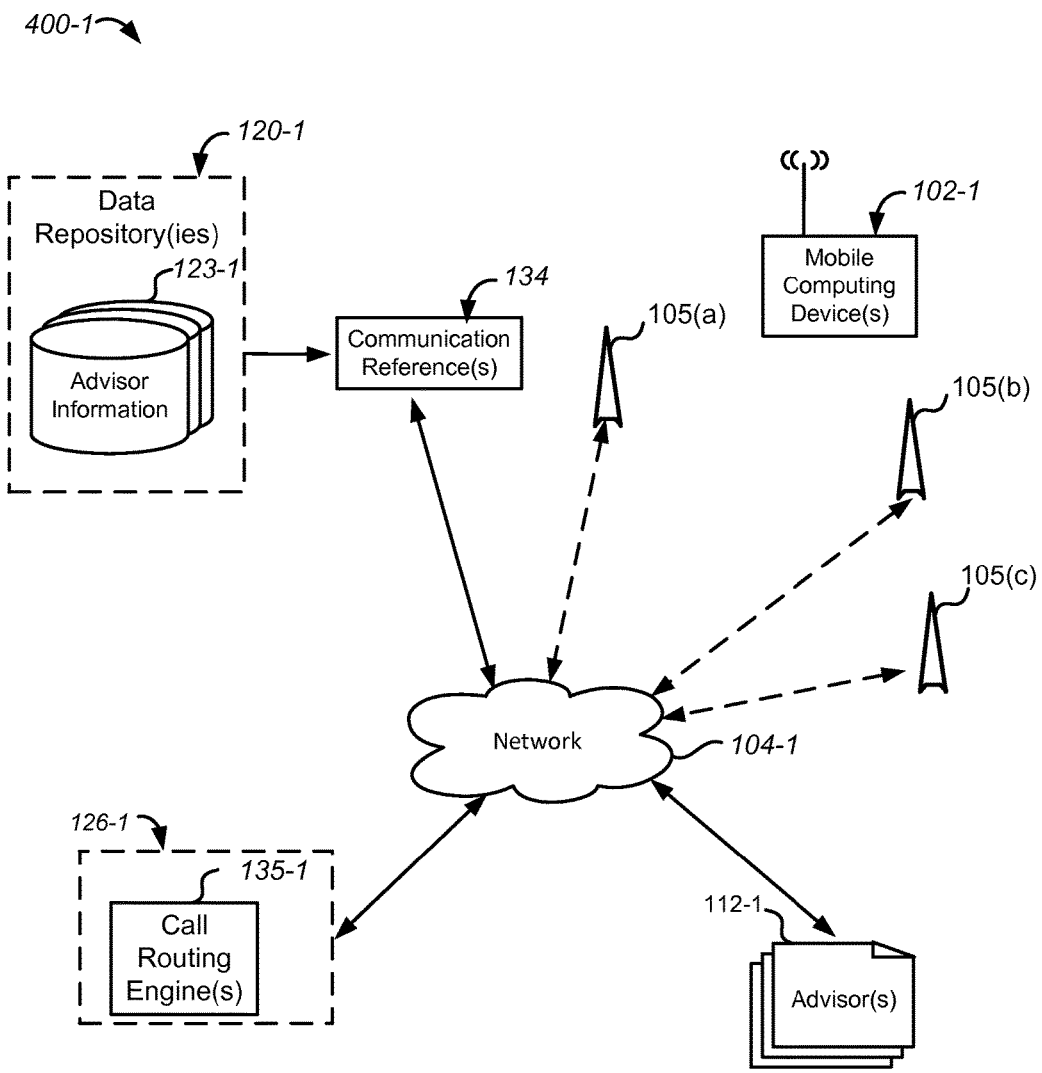
FIG. 5 shows a diagram of a system for call handling, in accordance with certain embodiments of the present disclosure.

FIG. 5 shows a diagram of a system 400-1 for call handling, in accordance with certain embodiments of the present disclosure. The system 400-1 may correspond to the system 400 for certain embodiments where the end-user computing devices 102 are mobile computing devices 102-1. The mobile computing device(s) 102-1 may access the network 104-1 through a wireless link to an access point. For example, the mobile computing device(s) 102-1 may access the network 104-1 through one or more of access point 105(a), access point 105(b), access point 105(c), and/or any other suitable access point(s). The access points 105 may be of any suitable type or types. For example, an access point 105 may be a cellular base station, an access point for wireless local area network (e.g., a WiFi access point), an access point for wireless personal area network (e.g., a Bluetooth access point), etc. The access point 105 may connect the mobile computing device 102 to the network 104-1, which may include the Internet, an intranet, a local area network, a public switched telephone network (PSTN), private communication networks, etc. In some embodiments, access point(s) may be used in obtaining location information for the mobile computing device 102, as described further herein.

Figure 6:
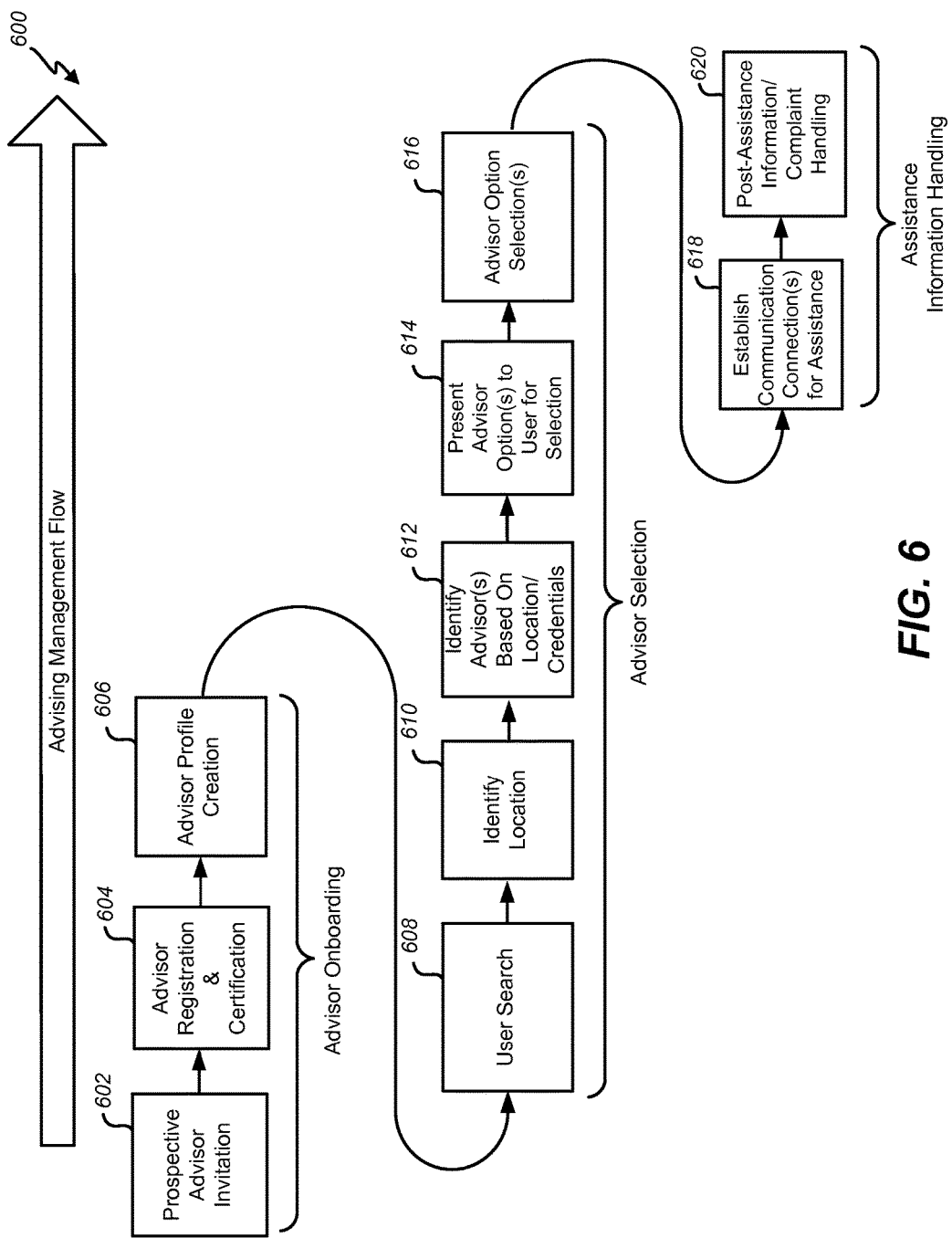
FIG. 6 is a block diagram that illustrates certain aspects of an advising management lifecycle, in accordance with certain embodiments of the present disclosure.

FIG. 6 is a block diagram 600 that illustrates certain aspects of an advising management lifecycle, in accordance with certain embodiments of the present disclosure. Diagram 600 may represent an overview of certain aspects of such a lifecycle, including overall flows involved. Teachings of the present disclosure may be implemented in a variety of configurations. As such, the order of the aspects comprising the lifecycle may be shuffled in any suitable manner and may depend on the implementation chosen. Moreover, while the following aspects may be separated for the sake of description, it should be understood that certain steps may be performed simultaneously or substantially simultaneously.

One aspect of the life cycle may correspond to a set of interactions with a prospective advisor in an onboarding phase. A prospective advisor may include an advisor that has not yet been approved for participating in an advisor program according to certain embodiments. A prospective advisor may include an advisor that has yet to pass a certification process in order to participate in the program. The advisor interface provided by the platform may facilitate the onboarding phase. In various embodiments, an advisor interface may include providing one or more display screens that may each include one or more user interface elements. An advisor interface may include any text, image, and/or device that can be displayed on a display screen for providing information to a user and/or for receiving user input. An advisor interface may include one or more widgets, text, text boxes, text fields, tables, grids, charts, maps, hyperlinks, buttons, lists, combo boxes, checkboxes, radio buttons, and/or the like.

In some embodiments, the onboarding phase of the life cycle may include a prospective advisor invitation stage, as indicated by block 602. In some embodiments, the onboarding phase of the life cycle may include an advisor registration and certification stage, as indicated by block 604. In some embodiments, one or more automated process flows may facilitate the provisioning of prospective advisors with accounts and registration. Advisor accounts may be created in various ways in various embodiments. For example, account creation may be initiated by the system. The system could initiate onboarding by automatically identifying the advisor and presenting a prospective advisor a communication reference, such as a link, inviting the prospective advisor to register and create an account.

Certain embodiments may provide for a certification process that is automatically triggered by registration. Certification may include one or more of background checks, criminal record checks, validating identities, e.g., via social security numbers, sex offender background check, validating insurance, validating certifications/licenses, and/or the like. A certification process could be performed at least in part by a third party, in some embodiments. Once the certification process has been triggered by registration, the system 106 may automatically generate one or more messages, seeking one or more of various certification checks from the one or more data sources 108, 111. In some embodiments, one or more page flows may be provided for conveying results of the certification checks to the system 106. In some embodiments, the system 106 may be configured to extract pertinent information from a data source repository and/or message sent to the system 106. According to certain embodiments, data may be actively gathered and/or pulled from one or more data sources 108, 110, for example, by accessing a third party repository and/or by "crawling" various repositories. With some embodiments, certain of the data pulled and/or pushed from one or more of the data sources 108, 110 may be made available by the advising information handling system 106 for user(s) of the advisee interfaces 102 and/or advisor interfaces 112.

Once a prospective advisor has passed the certification process, the certified advisor may be able to participate in the program. The certified advisor may be indicated in the system 106 as being certified. For example, a business relationship attribute may be defined, stored in the system 106, and associated with the advisor may be updated accordingly. In some cases, manual intervention may be required for final review and approval before participation is allowed. For instance, a notification could be automatically generated and sent to an administrator responsive to the business relationship being updated to certified status.

The onboarding phase of the life cycle may include an advisor profile stage, as indicated by block 606. The advisor profile stage may include a process of ensuring that an advisor fills out a provider profile completely. An advisor profile may include information regarding an advisor's certifications, permits, licenses, experience, hours of availability, specialties, proficiencies, types of payments that are receivable, contact information, notification preferences, device configurations/capabilities, billing information, certification information, information on locations, and/or the like. An advisor profile may include persistent information that is maintained about an advisor. An advisor profile may include any data stored in an advisor information repository whether or not it is part of the profile as shown to an advisor via an advisor portal. With the advisor profile, an advisor may be able to indicate specific services for which the advisor is to provide service. The advisor could also indicate, implicitly or explicitly, specific services which the advisor does not provide.

In some embodiments, the advisor profile may include a notification profile. The notification profile may specify parameters for notifying the advisor, and could also specify parameters for advisor responses to notifications from the system, such as a notification regarding an incomplete profile or issues with certification, insurance, and/or the like. In some embodiments, the platform may send a notification to an advisor, which notification, for example, could be provided via an advisor dashboard provided via the platform. However, any suitable means of notification may be employed. For example, text, voice, e-mail, alerts with the application, and/or the like could be sent. The notification could include a link or other communication reference referring back to the platform, prompting the advisor to respond. For example, the notification could provide a link for users to log into the platform to respond. In some embodiments, the advisor may respond via the same medium in which the notification was sent (e.g., text, voice, e-mail, etc.), and the system 106 may process the response, extracting requested information.

In some embodiments, certain price constraints may be specified for certain advisors. The price constraints may be specified for certain services. A constraint could be imposed on advisors to maintain certain prices for certain services. Advantageously, in some embodiments, such price constraints can, in some embodiments, be configured so that if an advising need arises, an available advisor would accept the advertising task at the constrained price. In some embodiments, consequent to consumer selection of an advisor, a transaction may be processed automatically on behalf of an advisor according to an advisor profile wherein an advisor commits to certain prices for certain services when the advisor is available to provide service. The price constraints could be specified in the advisor profile. Charges could differ depending on the advisee. For example, an advisor may charge differently if advising a room full of people, say, via a conference call, as contrasted with advising an individual via an individually dedicated call. Additionally, certain rates, fees, and cuts between the advisor and the business employing the platform may be specified.

One aspect of the life cycle may correspond to an advisor selection phase. The platform may identify a set of available advisors corresponding to the user's need. In some embodiments, the platform may present a set of available advisors corresponding to the user's need to may allow the user to select an advisor. The advisor selection phase of the life cycle may include a stage directed to consumer searching, as indicated by block 608. A user interface may be presented to the consumer to facilitate searching. With the consumer interface, the consumer may input search criteria corresponding to an advising need. The search criteria may indicate a desired service and a location for the requested rendering of service.

In various embodiments, a consumer interface may include providing one or more display screens that may each include one or more user interface elements. A consumer interface may include any text, image, and/or device that can be displayed on a display screen for providing information to a user and/or for receiving user input. A consumer interface may include one or more widgets, text, text boxes, text fields, tables, grids, charts, maps, hyperlinks, buttons, lists, combo boxes, checkboxes, radio buttons, and/or the like.

The advisor selection phase of the life cycle may include a stage directed to location identification, as indicated by block 610. In some embodiments, the consumer may input search criteria corresponding to a location of the advising need. The consumer could search based on service type, keyword, and/or select predetermined search options to indicate search criteria. The consumer interface could include a location selection option. In embodiments where the user's current location is automatically identified, that current location could be presented to the user as default location such that the user need not specify a location if the user's current location corresponds to the location for desired service. In various embodiments, the location could have any suitable level of specificity, e.g., including a county, a municipality, a zip code, a street, or an address. In the case that another location is desired, the page flow may present any suitable options so that the user may indicate the location, e.g., textually by way of a text entry field and/or graphically by way of selection with a map rendered on the user's computing device.

In some embodiments, the location may be automatically determined, for example, by way of the user's computing device. For example, a user may be interested in requesting a locksmith to come to a particular location and provide locksmith services, and the user's current location may be gathered via the user's computing device. Having automatically identified the user's current location, the user's current location could be presented to the user as a default location such that the user need not specify a location in the future. In the case that another location is desired, the user may indicate the location in any suitable manner, e.g., textually by way of a text entry field and/or graphically by way of selection with a map rendered on the user's computing device.

In some embodiments, user-selectable options for further specifying the advising need may be triggered by the initial search and presented to the consumer. In some embodiments where a date and/or time selection option has not already been presented, the option may be presented along with the set of advisors corresponding to the search criteria. In some embodiments, a set of pre-determined options to facilitate diagnosing a problem or otherwise characterizing/categorizing a need may be identified by the system based on the initial search. The options may be based on a decision tree, whereby characterizing/categorizing options may flow from more general classifications to more specific subclassifications to any suitable degree of specificity. In some embodiments, the consumer interface could include a description field for the user to enter a description of the advising need. For example, a text entry field could allow the user to textually describe the need and provide any information the user desires to enter and/or is prompted to enter by the user interface.

The advisor selection phase of the life cycle may include an advisor identification stage, as indicated by block 612. One or more advisors may be identified as having expertise with respect to the need and as having the appropriate accreditation/credentials for the need and the location of the user. One or more of advisor information, regulatory information, insurance information, location information, and/or advisor profiles may be searched for indications of corresponding accreditation/credentials. A set of rules may be used for matching a user/caller and with one or more counselors, based at least in part on things for which particular advisors are qualified and licensed. In some embodiments, a user/caller profile may indicate the pertinent jurisdiction. In some embodiments, the jurisdiction pertinent to the user/caller may be based on the location from which the call is originated (e.g., if a profile is not already set up for the caller).

The advisor selection phase of the life cycle may include an advisor option presentation stage, as indicated by block 614. The platform may present a set of available advisors corresponding to the user's advising need from which the advisee may select an advisor. Any suitable advisor listing information could be made available to the user for informative selection, including expertise identification and ratings, customer ratings, relevancy scores, credential information, links to third party provided credential information, links to corresponding advisor profiles, reviews, videos, etc. Insurance coverage could be presented to an advisee as added information for consideration. Exposing insurance information and additional details while keeping advisors anonymous may provide value to the advisee and the advisor. Other details, such as how many years an advisor has been available on the platform, how many years an advisor has been in practice, etc., may be provided.

The set of available advisors could be ranked according to one or more such bases and presented in a ranked order. Various sorting options may be presented to the user for sorting the list of advisors so that the list could be sorted according to any suitable basis. The advisor selection phase of the life cycle may include an advisor option selection stage, as indicated by block 616. A user may select a particular advisor by selecting one or more user-selectable options which may be presented in any suitable way.

One aspect of the life cycle may correspond to a set of interactions with a selected advisor in an assistance information handling phase. The assistance information handling phase of the life cycle may include a communication connection establishing stage, as indicated by block 618. As discussed herein, communication between an advisee and an advisor may be established via telephonic connection, chat connection, game voice chat, private chat, video chat, videoconferencing, videophone calls, web conferencing, and/or the like so that the advisee may indicate an advising need and so that the advisor may assist. In various embodiments, any suitable means of communication may be employed to enable an advisor and advisee to hold a dialogue in order to both identify the advisee's need and provide the best response to it. The advisor and/or advisee may obtain an image, a video, a live stream, etc. to facilitate communication. This may include provision of a communication reference for establishing communication with an advisor and/or initiates a flow that leads to a communication session with an advisor. In some embodiments, a communication reference may include a link that, when selected, launches a browser (or browser window) and retrieves content available on the web. In some embodiments, a communication reference may include link to establish communication via telephonic connection, chat connection, game voice chat, private chat, video chat, videoconferencing, videophone calls, web conferencing, and/or the like. The communication references may allow routing of communications between end-user devices. In various embodiments, a communication reference may include a text number, a click-to-text option, a phone number, a click-to-call option, an email address, a click-to-email option, and/or the like. In some embodiments, a service may include a feature that allows an advisor to view at least a portion of the screen display that an advisee is viewing.

The assistance information handling phase of the life cycle may include a stage directed to post-assistance information handling for a selected advisor and an advisee, as indicated by block 620. In some embodiments, a time tracking indicator could indicate time associated with a service provided to the advisee. A financial engine associated with the advisee's account and/or the assistance advisor's account can track the advisee's selections, session durations, and/or the like for one or more sessions. Purchases can be charged to the advisee's account, and compensation can be credited to the advisor's account. The financial engine may be configured to perform some or all the functionality associated with financial transactions with services provided.

After the advising session has been completed, in some embodiments, the advisor may confirm the service completion via the advisor interface either on the advisor's initiative and/or responsive to a follow-up message sent by the platform. In some embodiments, the platform may automatically send a follow-up message to the advisor, requesting confirmation of whether a service was completed. In some embodiments, the platform may automatically determine that an advising session has been completed based on whether a duration of the communications has met a particular time threshold.

In some embodiments, an indication of advising session completion may trigger a notification to the advisee. The platform may automatically send a notification prompting the advisee to provide a review of the advisor. The advisee may follow an included communication reference to the platform and provide the review, or, in some embodiments, the advisee may provide the review by replying to the message via the same means. A submission of a review may automatically trigger the allotting of a reward to the advisee.

The post-assistance information handling may include complaint handling. In some embodiments, a complaint channel could be provided via the platform. The complaint channel could be a separate communication channel to capture complaint data and could be different from the communication channel for reviews. The system could include a complaint handling engine to process complaint information, handle complaint processing, process associated workflow, and handling sending/receiving of complaint-related notifications. A user-selectable complaint option could be presented to the advisee. The user-selectable complaint option could be distinct from an ordinary customer review option. The user-selectable complaint option could be, in some embodiments, presented along with the ordinary customer review option. The user-selectable complaint option could be presented after a negative customer review has been received in some embodiments.

In some embodiments, indication(s) of a problem could be conveyed to the appropriate licensing authority. The system could relay complaints. For example, after receiving a threshold number of complaints having threshold gravity, the system could relay complaints the appropriate licensing authority. This could be automatic, or a notification could be triggered to be sent to an administrator for manual review. The system could have a repository for complaints, which could correspond to the advisor information repository.

Responsive to a complaint, an automated workflow could confirm that the complaining advisee actually had communications with the complained about advisor via the system. Any of various specifics surrounding the communications could be tracked, confirmed, compiled, and conveyed. For example, such specifics could include the date and duration of the advising session, the advising need, how much was charged, etc.

In some embodiments, a complaining advisee could receive an automatic refund. The workflow could automatically refund all or a portion of the amount that the advisee was charged. For example, the advisee could be automatically refunded a portion that may correspond to the amount over that which the advisor was compensated, that is, the portion of the charged amount that was received by the business providing the platform. In some embodiments, the refund could be triggered by the gravity of the complaint. In some embodiments, complaining advisees could be tracked so that an advisee may not take undue advantage of the refund process. In some embodiments, after a threshold number of complaints are received by a particular advisee, a notification to an administrator could be triggered so that manual review of a complaint may be facilitated.

In some embodiments, a complaint and/or a number of complaints meeting a number/type/gravity threshold may automatically an information hold. The information hold may alter current information retention settings of the platform. Whereas information retention settings may normally provide for certain data recycling procedures, the information hold may selectively deactivate those procedures for a particular advisor and/or advisee. Information related to the particular advisor and/or advisee may thereafter be retained for possible review and/or transfer to an appropriate authority pursuant to actions based on the complaint(s).

Figure 7:
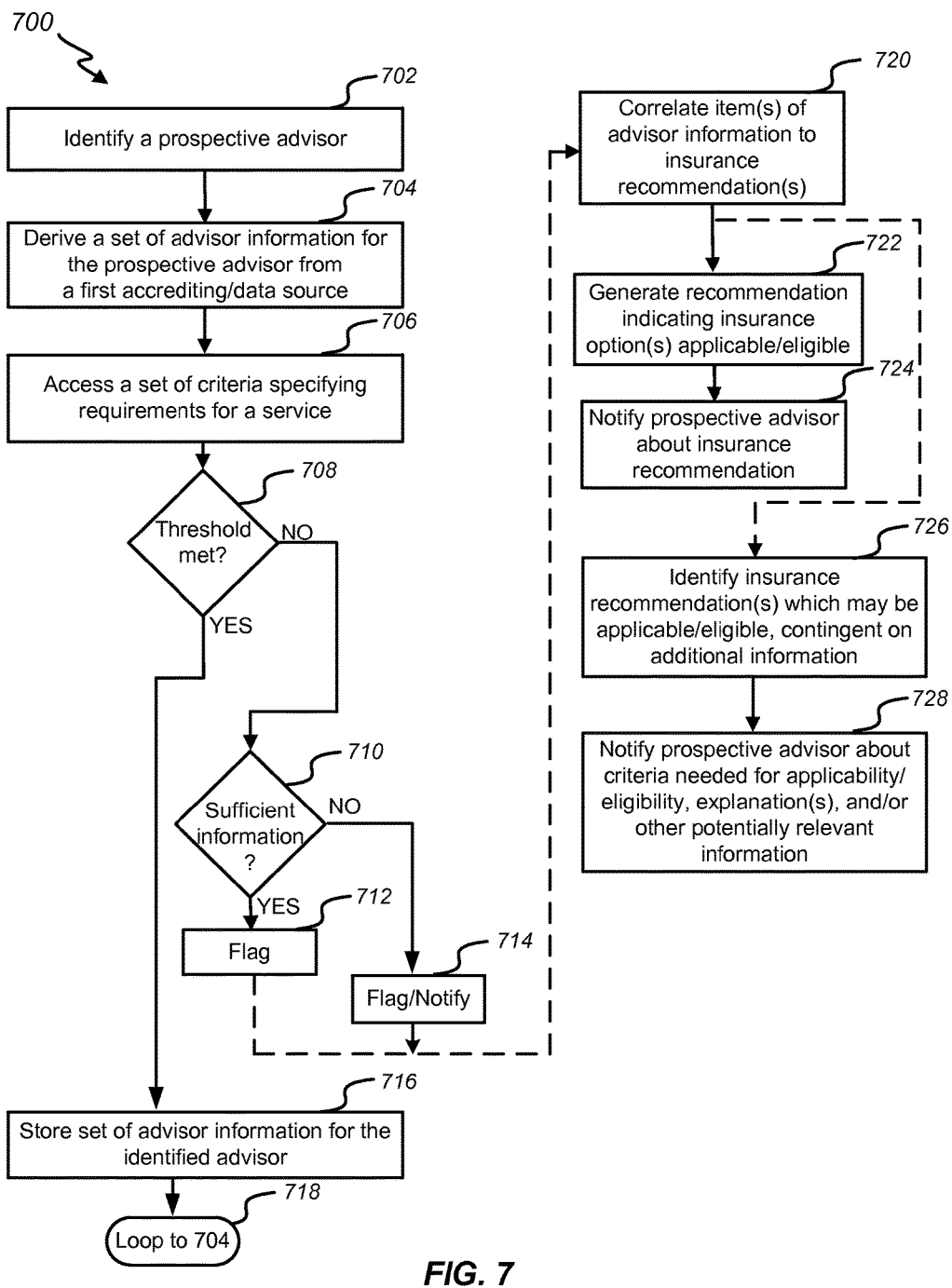
FIG. 7 illustrates an example method of handling advisor information, in accordance with certain embodiments of the present disclosure.

FIG. 7 illustrates an example method 700 of handling advisor information, in accordance with certain embodiments of the present disclosure. Teachings of the present disclosure may be implemented in a variety of configurations that may correspond to the systems disclosed herein. As such, certain steps of the method 700, and the other methods disclosed herein, may be omitted, and the order of the steps may be shuffled in any suitable manner and may depend on the implementation chosen. Moreover, while the following steps of the method 700, and those of the other methods disclosed herein, may be separated for the sake of description, it should be understood that certain steps may be performed simultaneously or substantially simultaneously.

According to one embodiment, the method 700 may begin as indicated by block 702. As indicated by block 702, a prospective advisor may be identified. As indicated by block 704, a first set of advisor information for the prospective advisor may be derived from a first accrediting and/or other data source. The advisor information may correspond to information relating to certification process that may include one or more of background checks, criminal record checks, validating identities, e.g., via social security numbers, sex offender background check, validating insurance, validating certifications/licenses, and/or the like. The derivation of such information could be performed in conjunction with information provided by a prospective advisor, such as information provided in setting up an advisor profile. As discussed herein, data may be actively gathered and/or pulled from one or more sources, for non-limiting example, by accessing a third party repository. Data could be gathered by "crawling" the various repositories in some embodiments. With some embodiments, sites of data sources may be linked with the system 106 so that updates available through the linked sites may be periodically found. In some embodiments, a web site/portal corresponding to a repository may be linked to the system 106 to facilitate notice and/or transfer of updated information. In addition or in the alternative, data may be pushed from one or more data sources to the system 106.

As indicated by block 706, a set of criteria specifying requirements for a service may be accessed. The set of criteria may correspond to any suitable information related to certification, licensing, and/or permit information. The information may include rules for professions, businesses, positions, practices, and/or services, associated with certification, licensing, and/or permit requirements and accreditation data sources, and associated with various jurisdictions.

The advisor information may be filtered with the set of criteria to identify pertinent requirements for the prospective advisor to provide servicers. One or more thresholds for advisor information may be identified based on the set of criteria for the prospective advisor. The threshold may be compared to the advisor information. As indicated by block 708, it may be determined whether the threshold has been met. If the threshold is met, the flow may continue to block 716 wherein the set of advisor information for the identified advisor is stored. After the advisor information is stored, the method 700 proceeds to block 718. As indicated by block 718, the flow may loop to block 704, as appropriate, with respect to handling additional information.

Returning again to decision state 708, if the threshold is not met, the method 700 proceeds to decision state 710, wherein it is determined whether sufficient information is available to make the threshold determination. If sufficient information is available, the method 700 proceeds to block 712, wherein the condition is flagged. In such instances, the prospective advisor may simply not be eligible for participation in the programs for one or more reasons. Returning again to decision state 710, if sufficient information is not available, the method 700 proceeds to block 714 wherein the information gap may be flagged. In certain embodiments, the prospective advisor may be notified. Thus, where there are gaps in information, the gap instances are noted in order to prompt for getting that information.

As indicated by block 720, item(s) of advisor information may be correlated to insurance recommendation(s). In the case that the prospective advisor does not have insurance coverage or in the case that the advisor's coverage status is unknown, insurance recommendations may be determined. The system could confirm whether advisor has a certain amount and/or type of insurance coverage.

As indicated by block 722, a recommendation may be generated to indicate which insurance option(s) are applicable and for which the advisor is eligible. In the case that an amount and/or type of insurance coverage is insufficient, the system may determine insurance recommendations for the prospective advisor. The recommendations may indicate a certain amount and/or type of insurance that the advisor needs in order to participate in the program. In some embodiments, one or more insurance recommendations may include an offer for insurance coverage. Insurance cost could be discounted because the advisor could remain anonymous when providing advice through the platform. Offered insurance coverage could be a value-add that allows an advisor to start off with very little liability. The advisor could work from home, and insurance could be provided by through the business implementing the platform. In some embodiments, the advisor may not be charged for the insurance until a threshold of advisor charges has been reached, with the system tracking advisor charges and determining when the threshold is met. Group rates could be used to provide insurance at discounts, for example, for groups of advisors. As indicated by block 724, the prospective advisor may be notified about the insurance recommendation.

As indicated by block 726, in some cases, additional advisor information may be needed to determine an insurance recommendation. In some embodiments, an insurance recommendation which may be applicable and/or for which the prospective advisor may be eligible may be identified. As indicated by block 728, the prospective advisor may be notified about the criteria needed for applicability/eligibility, explanation(s), and/or other potentially relevant information.

Figure 8:
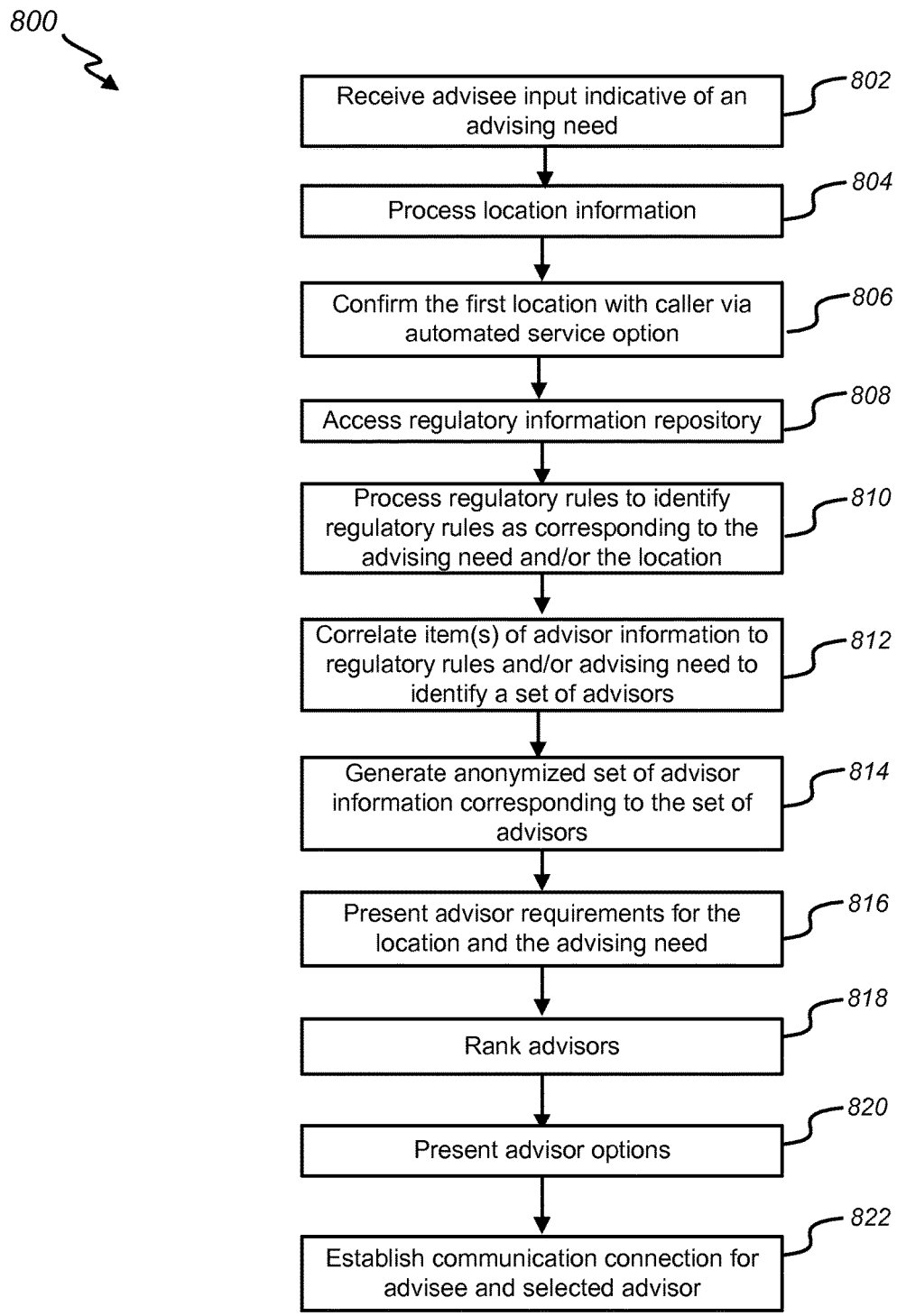
FIG. 8 illustrates an example method of advisor and advisee handling, in accordance with certain embodiments of the present disclosure.

FIG. 8 illustrates an example method 800 of advisor and advisee handling, in accordance with certain embodiments of the present disclosure. According to some embodiments, the method 800 may begin at block 802 wherein advisee input indicative of an advising need is received. Teachings of the present disclosure may be implemented in a variety of configurations that may correspond to systems described herein. As such, the order of the steps comprising the method 800 may be shuffled in any suitable manner and may depend on the implementation chosen. Moreover, while the following steps may be separated for the sake of description, it should be understood that certain steps may be performed simultaneously or substantially simultaneously.

The method 800 could allow for user identification of search criteria at any one or more of various suitable points in the process flow, according to various embodiments. By way of example without limitation, the user may identify search criteria prior to, contemporaneous with, and/or after any one or more of the method steps. In some embodiments, the search criteria may be set as a default, for example, for a user profile, an application, a mobile application, and/or an account associated with the user/user device. With some embodiments, an application and/or a mobile application may automatically perform one or more of the method steps.

Though not depicted in FIG. 8, in some embodiments, a mobile application 151, which is configured to run on a computing device 102, may be provided. The mobile application 151 may be provided in any suitable way. For non-limiting example, the mobile application 151 may be made available from the information handling system 106 or any website for download to the computing device 102; alternatively, it may be pre-installed on the mobile computing device. The mobile application 151 may be stored in the memory 134 and/or computer-readable media 146.

As indicated by block 802, advisee input may be received. The advisee input could correspond to a search query in some embodiments. A user interface may be presented to the consumer to facilitate searching. With the consumer interface, the consumer may input search criteria corresponding to an advising need. The search criteria may indicate a desired service and a location for the requested rendering of service.

The input could, in some embodiments, correspond to a telephone call to a telephone number. The telephone call may correspond to an advertisement for an advisor. The call could have been initiated in any suitable way. For example, the call could have been initiated by an end user dialing a telephone number that was displayed in an advertisement. In some embodiments, a telephone number may be presented in content information in a format such that, when the user selects a communication reference, the user device (e.g., a cellular phone or a computer) dials a telephone number corresponding to the communication reference. For example, the call could have been initiated by end user selecting a click-to-call option displayed via the user device. The user selection may be in the form of a keyboard/keypad input, a touch pad input, a track ball input, a mouse input, a voice command, etc. In some embodiments, user devices can automatically dial the telephone number. For example, a cellular phone, a computer or a PDA can dial a phone number using a Dual Tone Multi-Frequency (DTMF) generator. In some embodiments, the user device may initiate the phone call through a VoIP system.

In some embodiments, a type of call may be determined. It may be determined, for example, if the call is from one or more of a landline phone, a cellular phone, a portable number, and/or another line type. For example, in some embodiments, a received telephony message may be analyzed to determine a line type.

As indicated by block 804, location information corresponding to the advisee may be processed. The location information may indicate a location of the advisee. The information may be processed at, by, and/or with the computing device 102 and/or the information handling system 106. In some embodiments, the location engine may process location information. The information may be automatically gathered and may correspond to the location of the computing device 102. In some embodiments, the computing device 102 automatically determines its current position (e.g., via a satellite positioning system, or a cellular positioning system) and transmits the determined or estimated position to the location engine. The computing device 102 could provide the position in response to a request from the location engine.

For example, in the case of a cellular number, the user device may be a wireless mobile device, and the location of the wireless mobile device can be determined in a number of ways. For example, the computing device 102 may include one or more GPS receivers, one or more accelerometers, one or more magnetometers, and/or one or more gyroscopes that enable determination of its position based on data provided by these components and/or signals received by these components, such as received satellite signals. In certain embodiments, triangulation methods (e.g., triangulation based on cellular towers, Wi-Fi-based location, carrier-provided location, or any suitable cloud-based location method, service, source, and/or technique) may be employed to identify the location of the computing device. In the case of GPS, the GPS receiver may facilitate the identification of GPS coordinates.

In some embodiments, location information may be obtained from a cellular positioning system. An indication of a location from which the call originates may be derived at least in from base stations in relation to mobile computing device. In some embodiments, a cellular communication system may determine the location of a cellular phone. In some embodiments, a location of a cellular phone may be determined using a method known as Time Difference of Arrival (TDOA) in which the reception times of a cellular signal from a mobile station are measured at several base stations to determine the position of the cellular phone. Alternatively, a method known as Advanced Forward Link Trilateration (AFLT), or Enhanced Observed Time Difference (EOTD), can be used, which measures the reception times of cellular signals from several base stations to the cellular phone.

In some embodiments, the cellular site in which the mobile device can communicate to a based station can be used to determine a rough position of the cellular phone. In general, any method used by a cellular phone provider to get location information (e.g., for emergency service) can be used. An access point for a wireless local area network or a wireless personal area network typically has a small coverage area. Based on the location of the access point, location information (e.g., the city, or more precise location information) can be obtained. Location information may be obtained from a cellular location server, in some embodiments. The location may be based at least in part on and/or determined at the mobile station or determined at a server station. In some embodiments, a third party data source 108, such as a cellular advertiser, may provide indication of a location from which the call originates.

In some embodiments, the location of the mobile device may be determined via a satellite positioning system or a pseudolite positioning system. The location of the mobile device may be determined automatically through a Global Positioning System (GPS) receiver that is connected to, or built within, the mobile device. Pseudolites are ground-based transmitters that generate signals similar to a GPS. Pseudolites are useful in situations where signals from an orbiting satellite might be unavailable, such as tunnels, mines, buildings or other enclosed areas. A satellite/pseudolite signal receiver may determine its location and transmit the location through the cellular phone to a cellular communication system, or transmit the received signals to a location server which computes the location.

If a call comes from a landline phone, then an area associated with the phone number of the calling device may be indicated and with the calling device. For example without limitation, the area code of the number may indicate an area associated with the calling device. The first six digits may more specifically indicate an area associated with the calling device. This may indicate a location of the caller. For example without limitation, this may indicate a location of the caller within a radius of 15 miles, depending on the particular area.

In some embodiments, a geographic area associated with the phone number may be determined via a look-up in any suitable database using the telephone number of the caller. In some embodiments, a portable number may be identified at least partially based on cross-referencing one or more of portable telephone numbers, portable number databases, customer records, subscriber databases, operator databases, centralized databases, donor databases, and/or the like.

In some embodiments, the telephone number of the caller may be determined through Automatic Number Identification (ANI). For example, a call routing engine may determine the phone number of the user through ANI, which is a phone system feature that provides the billing number of the person making the phone call. Thus, the user phone number can be automatically determined through ANI, and ANI can be used to determine location information. Although the location information determined from ANI may not represent a correct position of a mobile device, content information about the location determined from ANI may still be of interest to the user.

In some embodiments, IP address of computing device, for example, a mobile computing device such as tablet, may be a basis for location information. In the case that the user device is accessing the Internet through an Internet Service Provider, location information for the user device can be obtained automatically from the Internet Service Provider.

In addition or in the alternative to automatically-gathered location information, a user may enter location information with the computing device 102. The user may identify any location interest by entering location information into the mobile computing device. The user may enter an address, a partial address, a city, a zip code, a location keyword, or any suitable location-indicating information.

In some embodiments, location information can be obtained from user preference/profile data. In some embodiments, when the user searches for information without explicitly specifying a geographic area, the geographic area of interest can be determined based on typical geographic radius of interest on the topic and the location of the user. In some embodiments, information associated with particular communication reference/phone number, such as the media channel used to provide the communication reference/phone number to the user, is decoded/retrieved using the advertiser information repository. Thus, the information associated with the communication reference/phone number can be tracked/stored, and location information can be inferred from the tracked information.

As indicated by block 806, some embodiments may include an option where a location may be confirmed with the caller. At any suitable point after a location has been identified, the location may be confirmed via an automated check. For example, an automated service option could be directed to the caller, saying, "We see you are calling from around Bakersfield, Calif. We presume that you are seeking advice as it pertains to California. Is that right? If that is not right, state the correct location or press 2."

If the first location is correct, the process flow may continue based on that first location. If the first location is incorrect, a different location may be identified. For example, a response by the caller indicating the different location may be identified with the voice recognition system and the call handling engine. The different location could be entered by the caller via the computing device in any suitable way. With the different location identified, the process flow may continue based on that different location as the "first location." Accordingly, while the first location may be guessed with proximity techniques, if the guess is wrong, the call is not misdirected to advisors that are not licensed, certified, and/or permitted to serve that particular location.

As indicated by block 808, a regulatory rules repository may be accessed. As indicated by block 810, one or more regulatory rules may be processed. A set of regulatory rules may be identified as corresponding to one or more of the advising need and/or the location. The set of rules may govern the certifications, licenses, and/or permits that are required for the jurisdiction corresponding to the location and the advising need.

As indicated by block 812, item(s) of a set of advisor information may be correlated to the identified rules and/or the advising need. A set of advisor information may be processed. The set of advisor information may correspond to a set of identified advisors. The advisor information may be stored in one or more data repositories.

A set of one or more advisors may be selected based on a correlation of advisor information with the set of one or more identified rules such that the set of advisors have credentials that satisfy requirements indicated by the set of rules for the jurisdiction and the advising need. In some embodiments, the first set of advisor information may be selected based at least in part on an advising service type. In some embodiments, the first set of advisor information may be selected responsive to a user selection of search criteria for advisor information. In some embodiments, the first set of advisor information may be selected based at least in part on the location. For example, those advisors meeting the jurisdictional requirements, having the required certification, licenses, and/or permits to provide the type of advice corresponding to the advisee's need, may be included in the first set.

In some embodiments, a set of advisors corresponding to the advising need may be identified prior to correlation to the identified rules, such as at a previous point in the flow; in some embodiments, a set of advisors corresponding to the identified rules may be identified prior to correlation to the advising need, such as at a previous point in the flow. In some embodiments, step 812 is performed prior to and/or independent of any user selection of search criteria for advisor information. In various embodiments, step 812 may be performed at, by, and/or with the computing device 102 and/or the search engine.

In some embodiments, an area proximal to the location may be identified. The area proximal to the location may correspond to a search area. In other words, the area may be the prime area in which to search for advisors. According to some embodiments, the information handling system 106 identifies the area proximal to the location. According to other embodiments, the mobile application executed on the computing device 102 identifies an area proximal to the location. In some embodiments, the area selector identifies an area proximal to the location.

In some embodiments, a subset of advisor information out of the set of advisor information may be processed. The subset of advisor information may correspond to a subset of identified advisors. In some embodiments, the subset of advisor information may be selected based at least in part on the area proximal to the first location. For example, those advisors located within the area proximal to the first location may be identified, and the subset of advisor information may correspond to those advisors.

As indicated by block 814, an anonymized set of advisor information corresponding to one or more of the set of one or more advisors may be generated. As discussed herein, the extent and application of anonymization may depend on various factors.

As indicated by block 816, advisor requirement information may be presented to the advisee. The requirement information could correspond to the location and the advising need. For example, information on licensure and/or other requirements that are required for an advisor corresponding to the advisee's need to advise in a particular jurisdiction may be presented. An explanation, such as an FAQ, may be presented to explain, say, here is what is needed to do X. The requirement information may be presented consequent to confirmation of the location and/or advising need in some embodiments.

As indicated by block 818, identified advisors may be ranked. Any suitable criteria may be used for the ranking. In some embodiments, the ranking of the advertisement candidates is partially based on the degree of matching of advisor to the advising need. In some embodiments, advisors may be ranked based at least in part on customer ratings.

As indicated by block 820, advisor option(s) may be presented to the advisee, as discussed herein. For example, the first set of advisor information may include any suitable listings, location, credential information, a link to an anonymous blog spot provided to advisor by the platform, and/or other advisor information (any of which could be anonymized) corresponding to any number of advisors. As indicated by block 822, responsive to user selection, a communication connection for the advisee and a selected advisor may be established, as discussed herein.

In some embodiments, a phone number for the selected advisor may be determined. For example, in some embodiments, the call routing engine may determine the phone number for the selected advisor using the advisor information repository. A phone call may be routed/connected to the phone number for the selected advisor. For example, in some embodiments, the call routing engine may connect the phone call, as discussed herein. The call routing engine could direct the call to the telephone number of the advisor. In some embodiments, a phone router may transfer the call to the telephone number of the advisor. In some embodiments, the telephone number of the advisor may be provided to the user device, and the user device may initiate the phone call. In some embodiments, a phone router may be used to initiate phone calls both to the user device (or a separate user phone) and the target phone and then join the phone calls to connect the user to the target phone. In some embodiments, the selection of the target phone number is transmitted to the corresponding media channel, which forwards the request for making the phone call to a server (e.g., a web server) connected to the phone router. Alternatively, the content information can be formatted so that the selection is sent directly to the server that is connected to the phone router.

Figure 9:
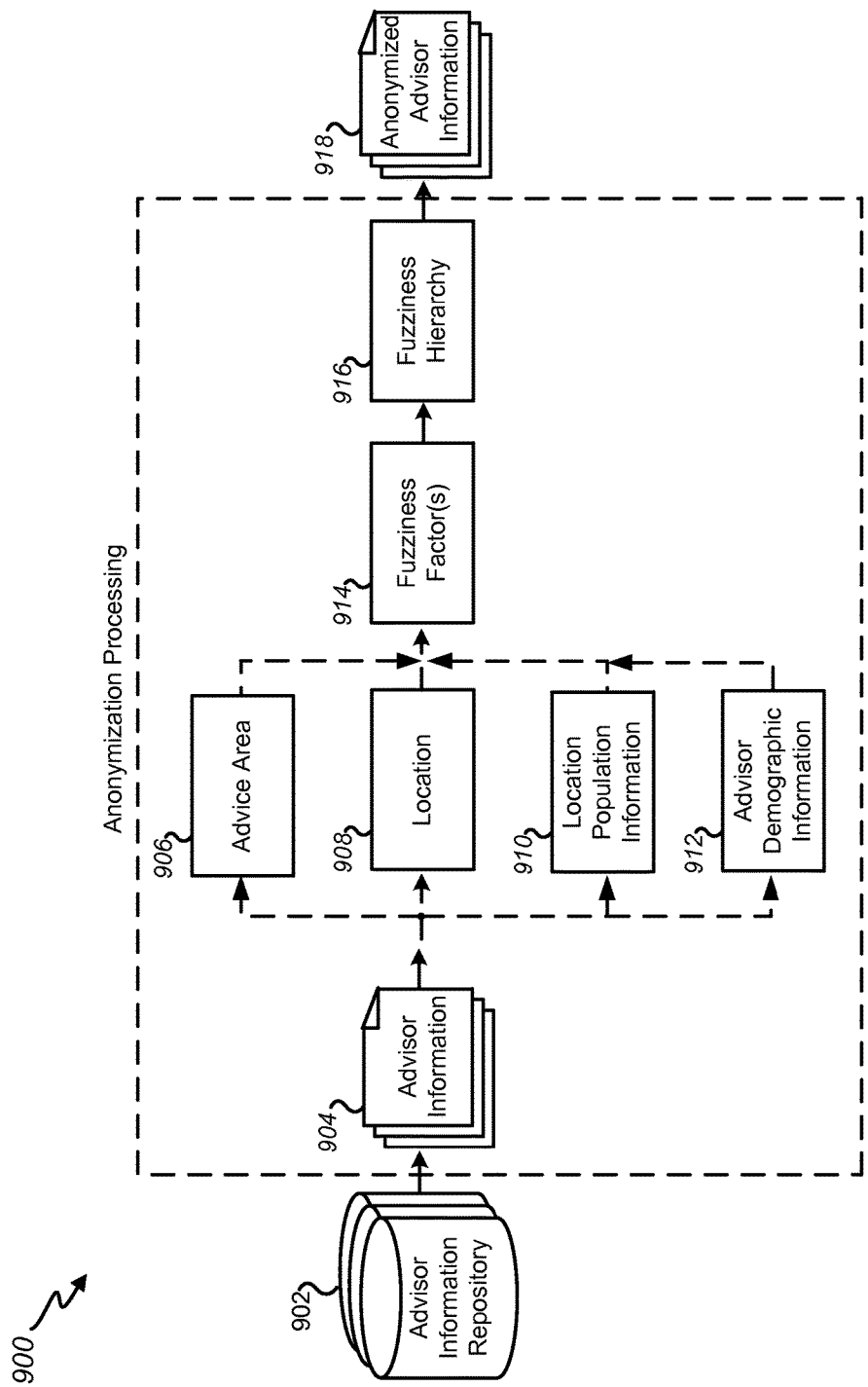
FIG. 9 is a simplified illustration of content handling, in accordance with certain embodiments of the present disclosure.

FIG. 9 is a simplified illustration of content handling, in accordance with certain embodiments of the present disclosure. In some embodiments, advisor information corresponding to the set of advisors may be anonymized. This may allow for sites for advisors who have their credentials verified, so that the consumer need not go through any undesired research. This also may allow for some protection for advisors. With certain embodiments, certain anonymized credential information may be exposed to an advisee. With certain embodiments, fuzziness may be applied to data if the data category is thin in order to facilitate anonymity. Fuzzing of data may include one or more of hiding information, removing information, obscuring information, and/or replacing information with generic terms, general references, and/or characterizations. Depending on the specifics of various cases, varying degrees of fuzziness may be applied to data in order to avoid exposing so many specifics so as to allow determination of advisor identity. Fuzziness may be applied according to a sliding scale so that enough information for an advisor's identity to be determinable may not be given to an advisee.

In some embodiments, an anonymization engine may process advisor information 904 from an advisor information repository 902 and may determine a fuzziness factor 914 for the information 904 according to a fuzziness scale. A fuzziness factor 914 may correspond to an extent to which items of advisor information 902 is to be fuzzed prior to presentation to the advisee. For example, a fuzziness factor 914 may correspond to a percentage which may indicate a percentage of the advisor information 902 that should be fuzziness for presentation. A fuzziness scale may include any suitable scale that allows for variable extents of fuzzing advisor information 904 to ensure anonymity of an advisor based at least in part on the location 908 and the particular advisor. This may accommodate the varying circumstances for particular advisors, particular advice areas 906, and/or particular locations. For instance, an advisor who is the lone advisor option in a particular advice area 906 for a particular location 908 that has a small population may need more fuzzing of the advisor's information to ensure anonymity than would an advisor who has comparatively greater numbers of competing advisors in an advice area 906 and in a high population area 910. As one specific hypothetical example, an iridology expert in North Dakota may need more fuzzing of information than would a marriage counselor in Southern California.

In some embodiments, a fuzziness factor 914 may be based at least in part on advisor demographic information 912 gathered from one or more data sources from which may be derived indication of a number of advisors corresponding to a particular advice area 906 and a particular location 908. In some embodiments, a set of one or more advisors may be determined to correspond to a percentage of an overall set of advisors for an advice area 906 for a location 908. For example, a set of advisors may correspond to ten advisers out of a total population of one hundred advisers in an advice area 906 for a particular location 908. In some embodiments, a higher percentage may correspond to a higher fuzziness factor 914. In some embodiments, a fuzziness factor 914 may be based at least in part on a ratio of a particular advisor to a set of available advisors via the platform, and/or a set of advisors for a location regardless of whether the advisers use the platform. In some embodiments, a fuzziness factor 914 may be based at least in part on a population density for the location. For example, a weighting table may be used to adjust a fuzziness factor 914; the table may include various adjustments accorded to various ranges of populations.

In some embodiments, at a minimum, an advisor's name may be anonymized. The advisor may be assigned an alias. The fuzziness factor 914 may be used to determine a number of advisor information items 904 that need to be obscured prior to presentation to an advisee. For example, if the fuzziness factor 914 indicates that 50% of the advisor's information items should be obscured, then half of the information items may be replaced with generic terms. For example, the name of the school to which an advisor went may be replaced with a generic reference to the school or type of school. Dates, such as dates of certification and/or graduation from schools, may be removed, obscured, and replaced with general references. Specific references to cities could be removed, obscured, or replaced with general references. Specific names of past employers in the advisor's experience profile could be removed, obscured, or replaced with generic terms or generic references to an industry.

In some embodiments, fuzzing can be applied according to a hierarchy 916. The hierarchy 916 could indicate an order of information items that defines the order in which certain types of information items should be fuzzed. For example, it may be desirable to fuzzy certain information items before others. City names could be fuzzed before employment references, employment references could be fuzzed before school references, school references could be fuzzed before date references, etc. Any suitable or desirable hierarchy 916 could be employed.

In some embodiments, fuzzing and fuzziness factors 914 may be determined on an information item basis. For example, in some embodiments, for each of various information items for a particular advisor can be compared to corresponding items of advisor population information for peer advisors. For example, a particular advisor may have iridology as an advice area 906 having graduated from a school in North Dakota. The system may search the advisor demographic information 912 for other iridology experts having graduated from a school in North Dakota. If only two iridology advisors are found to have graduated from a school in North Dakota, a high fuzziness factor may be accorded to the school identification information for the particular advisor. The school information may not be given or may be indicated generally as a school in the Midwest, for example.

Accordingly, a set of anonymized advisor information 918 may be generated. The anonymized advisor information 918 may be presented to an advisee in response to a user query. Thus, certain embodiments according to the present disclosure may provide for a fundamentally new advising experience by anonymizing an advisor, yet verifying his/her credentials, exposing credentials to the user, verifying insurance, providing insurance, and/or having connections with legal authorities to provide assurances, so that a consumer may avoid headaches in seeking assistance from an advisor. Certain embodiments may allow for increased trust and confidence in an advising platform and particular advisors facilitated by the platform. Certain embodiments may allow for coordination of information with legal entities, licensing authorities, certification authorities, and/or the like.

Figure 10:
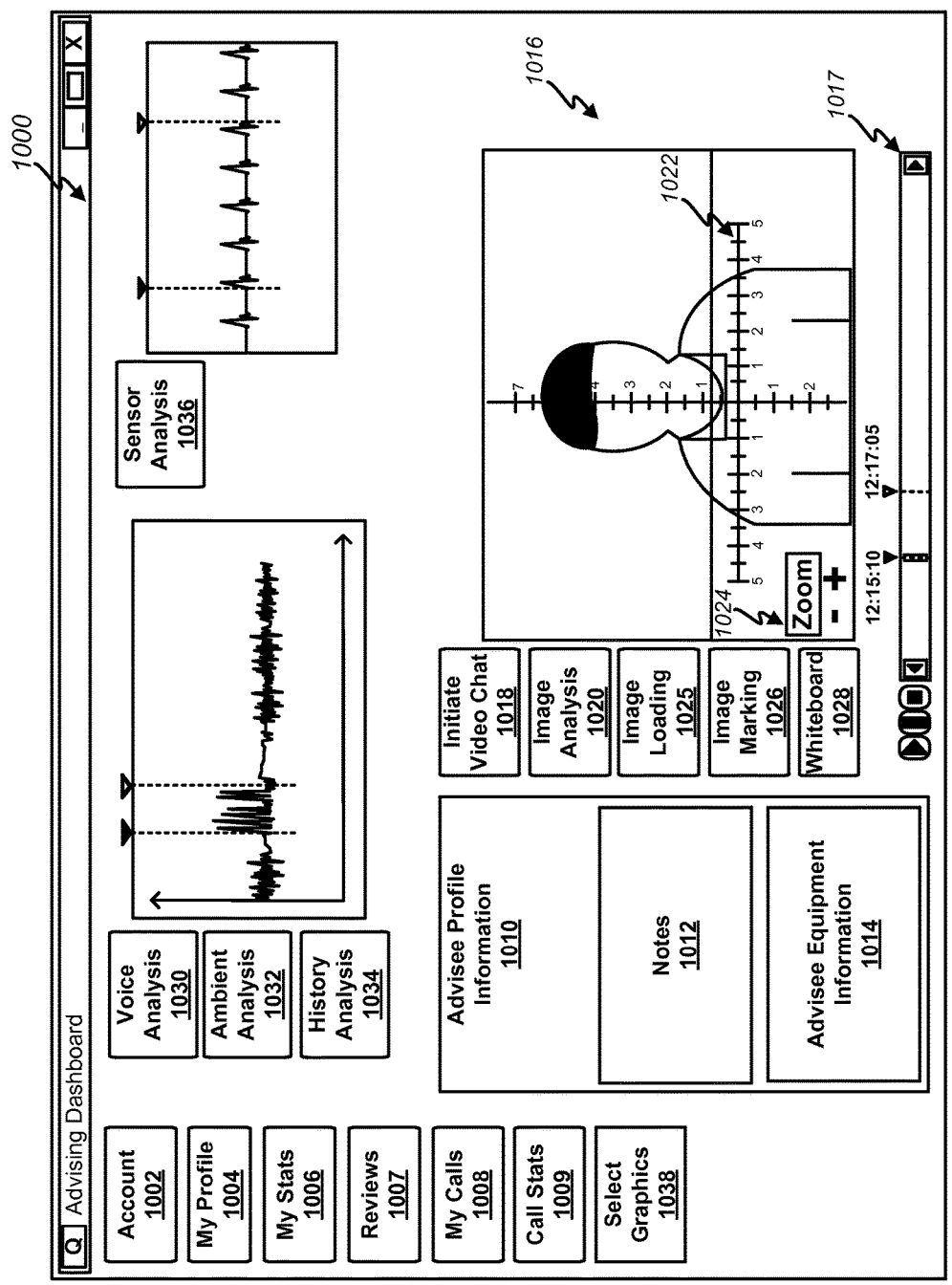
FIG. 10 illustrates one embodiment of an advisor interface for an advising platform, in accordance with certain embodiments of the present disclosure.

FIG. 10 illustrates one embodiment of an advisor interface for an advising platform, in accordance with certain embodiments of the present disclosure. Certain embodiments may provide for tracking of information regarding advisees. Tracked information could include information relating to equipment that an advisee uses and has used to interface with one or more advisors. For example, information about the specific devices, device configurations, and/or device capabilities that a give advisee uses could be tracked and retained in a repository. Such tracked information for a particular advisee could be made available to an advisor before, during, and/or after an assistance session for the advisee. In some embodiments, such advisee-related information could be provided by the advisee, the advisor, and/or via automatic detection by the system. For each advisee, a dossier could be compiled and made available to an advisor to facilitate assistance the advisee.

In various embodiments, an advisor platform may track calls, messages, billing, etc. and enable advisors to interact with the platform to retrieve, see, and use the data. A feed of information and/or a dashboard could be in a web portal and/or provided via a mobile application. The advisor could customize the dashboard and/or the feeds and what can be ignored, although default templates may be supplied.

Certain embodiments may provide for advisee history analysis. Certain embodiments may provide for an advisee history engine that manages, collects, retrieves, updates, and/or retains information relevant to a particular advisee. Certain embodiments may automatically identify a caller, correlate the caller to an advisee profile, and provide advisee profile information to the advisor to enrich the assistance session by making advisee profile information available to the advisor. Advisee profile information may provide the advisor with valuable context.

Certain embodiments may allow an advisor to record advisee information in a repository for later reference. Such provision of historical information particular to an advisee may allow the advisor to provide information appropriate for the advisee's specific needs. Certain embodiments may provide system features that automatically analyze and present historical information for an advisee, for example, via the advisor dashboard. The analysis of the information may include comparison of current information to past information for the advisee.

Certain embodiments may provide for advisee equipment configuration analysis. The particular information available to and advisor may depend on the capabilities and configuration of the media used. In some embodiments, the platform may retrieve and/or identify information about the capabilities of the advisee's computing device and/or communication medium, assess the capabilities against various analytical possibilities of a given advisor, and present capability information to the advisor.

In certain aspects, the advisor interface for the advising platform may include a dashboard 1000. For example, after an advisor logs into the platform, different data points that can be of use for the advisor may be presented to the advisor to facilitate advising. The dashboard 1000 may include any software process or module operable to present and receive information to/from an advisor 113, allow an advisor to monitor advisee information, select different types of advisee-related data, identify desired metrics, automatically generate dashboard views, customize dashboard views, and/or the like. The example of the dashboard 1000 is not limiting. In some embodiments, a dashboard 1000 may correspond to a mobile application interface.

In some embodiments, the dashboard 1000 may correspond to a page of the platform and/or an app that an advisor might see upon being connected with an advisee. The dashboard 1000 may provide a graphical user interface (GUI) that includes any number and type of user-selectable options to facilitate various embodiments. In various embodiments, one or more user-selectable options may include one or more of a screen-labeled function key, an icon, a button, a soft button, a window, a menu, a control widget, a scroll bar, a slider, a listbox, and/or the like. In various embodiments, one or more user-selectable options may be selectable via one or more of touch, push, movement-based selection, and/or any suitable navigation feature.

In various embodiments, to facilitate various aspects, the user-selectable options may include one or more of an account feature 1002, an advisor profile management feature 1004, an advisor statistics feature 1006, a call management feature 1008, and/or the like. The advisor page may allow for a high-level presentation of features that allow for drilling down into more specific features. In various embodiments, any one of the features of the dashboard 1000 may include automatically presented information. Information of interest may be automatically presented to the advisor.

In some embodiments, the advising information handling system 106 may include one or more account management modules. The account management module may be configured to allow an advisor to manage the advisor's account. Management options may be provided for the advisor to one or more of make changes to the account, contact customer service, change/update the advisor's profile, change/update the advisor's preferences, create/change/update the advisor's advertisements, select various advertising products, manage call-back settings, manage alert settings, and/or the like.

An advisor account management module may include logic to retrieve, process, derive, compile, aggregate, handle, store, report, and/or present information about items of interest associated with advisor accounts. For example, items of interest could include important activities associated with an advisor account. Items of interest could include whether an advisor is missing calls from consumers and other information associated with the missed calls, such as details surrounding the missed (e.g., number of calls, times of calls, numbers called, caller information, location information, and/or the like). Items of interest could include any billing information associated with the account. Items of interest could include any messages/calls associated with the account, such as messages from customer service, from advisee, and/or the like.

In some embodiments, a ratings/reviews feature 1007 may be configured to present access to details regarding ratings and/or reviews associated with an advisor's services. The ratings and/or reviews may correspond to advisee feedback per surveys and/or any suitable feedback gathering tool.

In some embodiments, a call statistics feature 1009 may be configured to present access to details regarding any of the advisor's calls. Options for presenting access to details about any of the advisor's calls can include providing details relating to one or several call, providing detail relating to the particular location of one or several call, providing details relating to one or several numbers used in making one or several calls, providing details relating to calls of interest, which calls of interest may be based on any suitable additional information, such as intelligence a particular caller of interest, a particular location of interest, etc., providing detailing relating to calls that were successfully connected, missed calls, dropped calls/calls receiving a busy tone, call-back statistics, call lengths, and/or the like. For instance, the call of interest feature could identify a number of calls from a particular call in a particular time period as an indication of interest. As another example, the call-back statistics features could indicate an advisor's average time to call an advisee back.

In some embodiments, advisee profile information 1010 may be presented. Certain embodiments may automatically identify a caller, correlate the caller to an advisee profile, and provide advisee profile information 1010 to the advisor to enrich the advising session. The advisee profile information 1010 may provide the advisor with valuable context. The advisee profile information 1010 may include information about a particular advisee, such as information relating to advisee location, biographical data, health conditions, life conditions, problems, advice provided, etc. The advisee profile information 1010 may include tracked information and retained pursuant to one or more previous advising sessions. In some embodiments, such advisee-related information could be provided by the advisee, the advisor, and/or via automatic detection by the system. Certain embodiments may provide for an advisee history engine that manages, collects, retrieves, updates, and/or retains information relevant to a particular advisee. For example, such tracked information may include information about an advisee's facial expressions, which may include micro-expressions, voice, speaking, body language, gestures, emotional indicia, writing, environmental context, and/or the like. Such tracked information for a particular advisee could be made available to an advisor before, during, and/or after an advising session for the advisee. Accordingly, for each advisee, a dossier could be compiled and made available to an advisor to facilitate advising the advisee.

The advisor may have the ability to annotate 1012 the advisee profile according to the advisor's judgment and such information may be retained for subsequent reference and comparison. The advisor may record advisee information for later reference. Such provision of historical information particular to an advisee may allow the advisor to provide information appropriate for the advisee's specific needs.

In some embodiments, information relating to equipment 1014 that an advisee uses and has used to interface with one or more advisors may be presented. For example, information about the specific devices, device configurations, and/or device capabilities that a given advisee uses could be detected and/or tracked, and presented to the advisor so that the advisor is aware of the capabilities of the advisee. The particular information available to and advisor may depend on the capabilities and configuration of the media used. In some embodiments, the platform may retrieve and/or identify information about the capabilities of the advisee's computing device and/or communication medium, assess the capabilities against various analytical possibilities of a given advisor, and present capability information to the advisor. For example, a computing device with a voice over IP capabilities may enable analysis of voice and speaking. For example, based on the advisee's configuration information, it may or may not be possible for certain aspects of the advisee's facial expressions, which may include micro-expressions, voice, speaking, body language, gestures, emotional indicia, writing, environmental context, etc. to be analyzed. For example, the resolution of the camera on the advisee's computing device may limit the extent to which certain image-based aspects may be analyzed. An analysis of the advisee's iris may require a minimum threshold of resolution for effective analysis, for instance. The advisee's computing device may or may not have writing capabilities to allow for the advisee's writing to be readily analyzed. For example, the advisee's computing device may allow the advisee to write on the device screen with a finger, stylus, or other tool of the advisee.

In some embodiments, a video interface 1016 may be provided. The video interface 1016 may provide for one- or two-way video communication between advisor and advisee. In some embodiments, a video chat session could be established between advisor and advisee. An option to initiate a video chat session 1018 could be presented. In some embodiments, the video interface 1016 may include navigation features 1017. Video content could be buffered and/or recorded to facilitate navigation and advising. The navigation features 1017 could include options to pause, play, stop, fast-forward, rewind, skip forward, skip backward, skip to certain times, and/or the like. The options could include a selectable navigation bar. In some embodiments, the video interface 1016 may allow for saving of video for further reference and/or analysis. In some embodiments, the video interface 1016 may allow for retrieving and replay of previous video content, e.g., from a previous video session. This may allow for enhanced advising.

In some embodiments, image analysis features 1020 may be provided. In some embodiments, an advisor and/or the system may utilize face, biometric and/or similar recognition/analysis (e.g., using pattern classification techniques) to determine characteristics of the advisee. Certain embodiments may provide for parsing techniques that identify and measure movements and/or various physical aspects of the imagery. For example, movements and/or various physical aspects of the advisee's face, eyes, and/or the like may be identified and measured. Physical aspects could be correlated to the geometrical shapes, recorded, and measured against reference information—whether it be previous information for the same subject and/or other reference information.

Captured image information may be analyzed to determine a state and/or a characteristic of an advisee. In some embodiments, image information may include a portion of the advisee, such as the advisee's face, eyes, hands, chest, etc. By analyzing the captured image information, the advisor and/or the system may determine state and/or a characteristic. Image information may be analyzed to determine whether there is a change in the advisor's states. In some embodiments, any one or combination of triggers may be detected (e.g., rapid change in eye movement and/or facial movement). Upon detecting the trigger(s), the advisor and/or the system may determine various characteristics. In one example, information of the advisee's chest may be analyzed to determine that the advisee's breathing rate has slowed down beyond a threshold value or increased beyond a threshold value, indicating various states/responses of stress, agitation, emotion, anxiety, excitement, etc. In another example, captured information of the advisee's blood vessel(s)/veins may be analyzed to determine that the advisee's heart rate has sped up or slowed down, indicating various states/responses of stress, agitation, emotion, anxiety, excitement, etc. Some embodiments may also analyze information of the advisee's eyes (e.g., eyelids, pupils) to determine various indicia of states/responses.

In some embodiments, reference indicia 1022, such as cross-hairs and/or target aperture, so that the advisor may focus the video with zoom features 1024 on various aspects of the subject imagery provided by the advisee, such as the advisee's face or other physical aspects. For example, the advisor may wish to closely examine any suitable physical feature of the advisee to facilitate the advising session. An advisor in the area of iridology, for instance, may wish to closely focus on the iris of the subject in order to analyze and/or explain aspects based on thereon. In some embodiments, reference indicia 1022 may allow for selection of certain aspects of imagery for focused image analysis of those aspects by the system.

In some embodiments, image loading features 1025 may be provided to view, upload, download, or otherwise handle still images. An image viewing and/or editing could be provided in addition to or in alternative to the view interface 1016. In some embodiments, image editing/marking features 1026 may be provided. One or more selectable items included in the graphical user interface to allow writing and/or marking the image, by for example making notations, or sketching, or the like on the displayed image. In some embodiments, the platform may provide a graphical user interface with a whiteboard feature 1028. The whiteboard feature 1028 allowing an advisor and/or advisee to write or draw on a whiteboard that could be provided in addition to or in alternative to the view interface 1016.

In some embodiments, voice analysis features 1030 may be provided for a voice and/or language analysis of voice input provided by the advisee. As previously noted, certain embodiments may provide for detecting and characterizing an advisee's voice. Spectral analysis techniques may be applied to indicate, for example, an advisee's emotional state. The platform could analyze the advisee's voice and present certain analysis results to the advisor, for example, with graphics. For example, such information may be presented to the advisor via an advisor dashboard. Any suitable voice analysis techniques may be employed. In some embodiments, various alternative and well-established analysis techniques may be presented as options to the advisor such the advisor may choose one or more of the techniques to be employed for a particular advisee. In some embodiments, an analysis for an advisee may be compared to data retained from one or more past advising sessions for the advisee. The detected voice data may be assigned a score and compared to reference information for the advisee and/or other reference information.

In some embodiments, environmental analysis features 1032 may be provided for detecting and characterizing an advisee's environment. As previously noted, in some embodiments, an environmental analysis for an advisee may be compared to data retained from one or more past advising sessions for the advisee. A normal environmental state may be identified for an advisee. Changes with the respect to the normal state may be identified and presented to the advisor, for example, via the dashboard. Environmental information may be detected through the media used. For example, background noise may be detected and measured and/or characterized during a phone call or video session. The background noise may be assigned a score and compared to reference information for the advisee and/or other reference information. Environmental information may be more specifically identified. For example, noise from a TV, other people, traffic, sirens, trains, pets, etc. may be more particularly identified. The advisor may have the ability to annotate the advisee profile according to the advisor's judgment and such information may be retained and for subsequent reference and comparison.

In some embodiments, advisee history analysis features 1034 may be provided for analyzing and presenting any suitable historical information. The analysis of the information may include comparison of current information to past information for the advisee. Past information may be graphically compared with current information via the dashboard 1000.

The system may include a threshold detection component that may analyze any advisee related information (voice, movements, or any sensed input, for example) in reference to any suitable threshold. When a threshold has been met or exceeded, a notification may be presented to advisor via the dashboard. The threshold may be predetermined and/or customizable by the advisor. The threshold may be set by the system as a default. The threshold may be based on system analysis of past information for the advisee. For example, past voice analysis may indicate certain norms, averages, ranges, and/or other characteristics of an individual advisee's voice pattern. One or more thresholds may be based on such past characteristics. For example, input signal amplitude exceeding or falling below a threshold for an amount of time may be flagged. Thus, when an advisee exhibited uncharacteristic voices aspects that exceeded the one or more thresholds, a notification may be graphically indicated to advisor via the dashboard.

In some embodiments, sensor analysis features 1036 may be provided. The sensor analysis features 1036 may be based on input elements that include one or more of the following physiological sensors: bioimpedance, respiration, respiration rate variability, heart rate (average, minimum, maximum), heart rhythm, heart rate variability, respiratory sounds, blood pressure, activity, posture, and/or temperature/heat flux. The input elements may include an activity sensor that may be one or more of the following: a ball switch, an accelerometer, a heart rate sensor, a bioimpedance noise sensor, a skin temperature/heat flux sensor, a blood pressure sensor, a muscle noise sensor, and/or a posture sensor. In some embodiments, heart rate or other physiological aspects may be detected in conjunction with the flash of the camera. For example, an advisee could place his finger over the flash so that heart rate may be detected.

A graphic selection feature 1038 may be configured to present access to details of advising information and/or any suitable data according various embodiments herein in any suitable format with any suitable graphics. By way of example without limitation, pie charts, bar graphs, line graphs, tables, with features allowing ordering and/or filtering of data according to any suitable criteria, matrices, Venn diagrams, images, photos, and/or the like may be implemented according to various embodiments. In some embodiments, the graphic selection feature 1038 may allow for advisor customization and/or manipulations of graphics presented with the dashboard 1000.

It is to be understood that the depicted dashboard 1000 is for example purposes only. Accordingly, the dashboard 1000 may provide a GUI that may include or present data for an advisor interface of an advising platform in any suitable format with any suitable layout of any suitable sets/subsets of features, along with any desired graphical depiction of information, to facilitate features of various embodiments of the present disclosure.

The advising information handling system 106 may include one or more logging modules. The logging module(s) may be configured to perform logging processes to receive and log data of interest for advising sessions. An advisee analytics module(s) may include logic to retrieve, process, derive, compile, aggregate, handle, store, report, and/or present information relating to data associated with advisees. The advisee analytics module may be configured to present any desirable information in any desirable manner. With respect to a particular advisor, the logging module and analytics module may facilitate various features of an advisor interface for an advising platform, in accordance with certain embodiments herein.

The logging module may include tracking logic to track calls, in accordance with certain embodiments. In some embodiments, the logging module may be configured to identify whether a caller is successfully connected with an advisor, whether the call is missed, whether the call is dropped/disconnected/receives a busy tone, whether the call is routed to voicemail, and/or whether a voicemail is left. In some embodiments, the logging module may include ANI logic to identify numbers of callers. In some embodiments, the logging module may be configured to track the length of calls. In some embodiments, the logging module may be configured to record calls.

In some embodiments, the advisee analytics module may be configured to present comparative data. For example, current advisee data may be compared to past advisee data. Any type of advisee data may be compared. An advisor may have user selectable options to select different types of statistics for comparison and order by different types of statistics.

Figure 11:
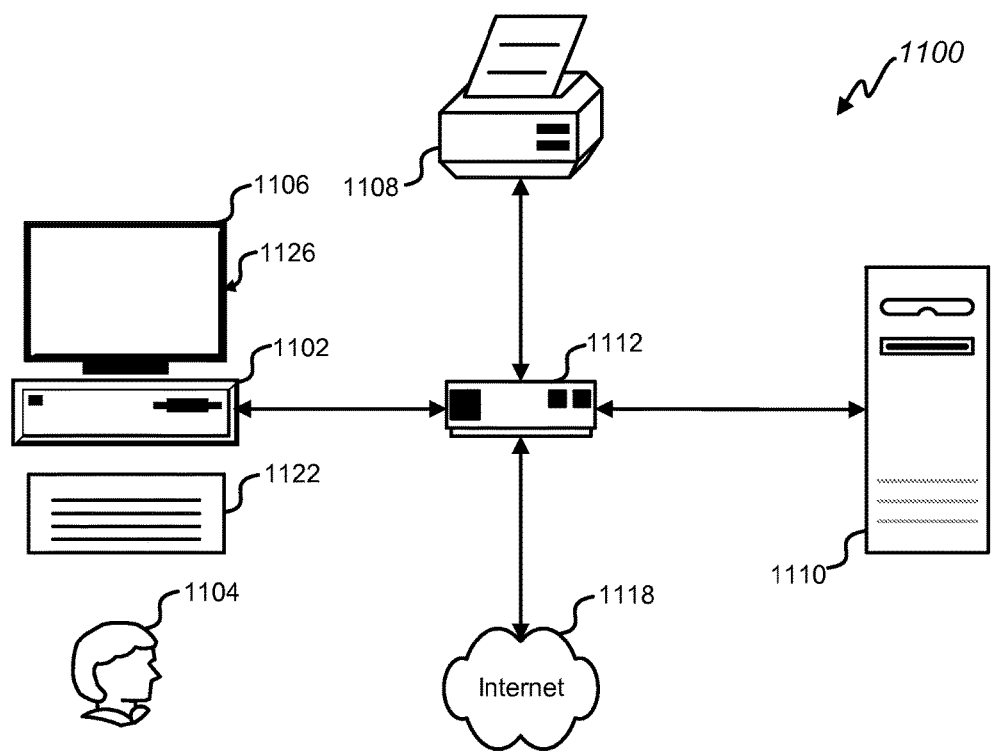
FIG. 11 depicts a block diagram of an embodiment of a computer system, in accordance with certain embodiments of the present disclosure.

Referring next to FIG. 11, an exemplary environment with which embodiments may be implemented is shown with a computer system 1100 that can be used by a designer 1104 to design, for example, electronic designs. The computer system 1100 can include a computer 1102, keyboard 1122, a network router 1112, a printer 1108, and a monitor 1106. The monitor 1106, processor 1102 and keyboard 1122 are part of a computer system 1126, which can be a laptop computer, desktop computer, handheld computer, mainframe computer, etc. The monitor 1106 can be a CRT, flat screen, etc.

A designer 1104 can input commands into the computer 1102 using various input devices, such as a mouse, keyboard 1122, track ball, touch screen, etc. If the computer system 1100 comprises a mainframe, a designer 1104 can access the computer 1102 using, for example, a terminal or terminal interface. Additionally, the computer system 1126 may be connected to a printer 1108 and a server 1110 using a network router 1112, which may connect to the Internet 1118 or a WAN.

The server 1110 may, for example, be used to store additional software programs and data. In some embodiments, software implementing the systems and methods described herein can be stored on a storage medium in the server 1110. Thus, the software can be run from the storage medium in the server 1110. In another embodiment, software implementing the systems and methods described herein can be stored on a storage medium in the computer 1102. Thus, the software can be run from the storage medium in the computer system 1126. Therefore, in this embodiment, the software can be used whether or not computer 1102 is connected to network router 1112. Printer 1108 may be connected directly to computer 1102, in which case, the computer system 1126 can print whether or not it is connected to network router 1112.

Figure 12:
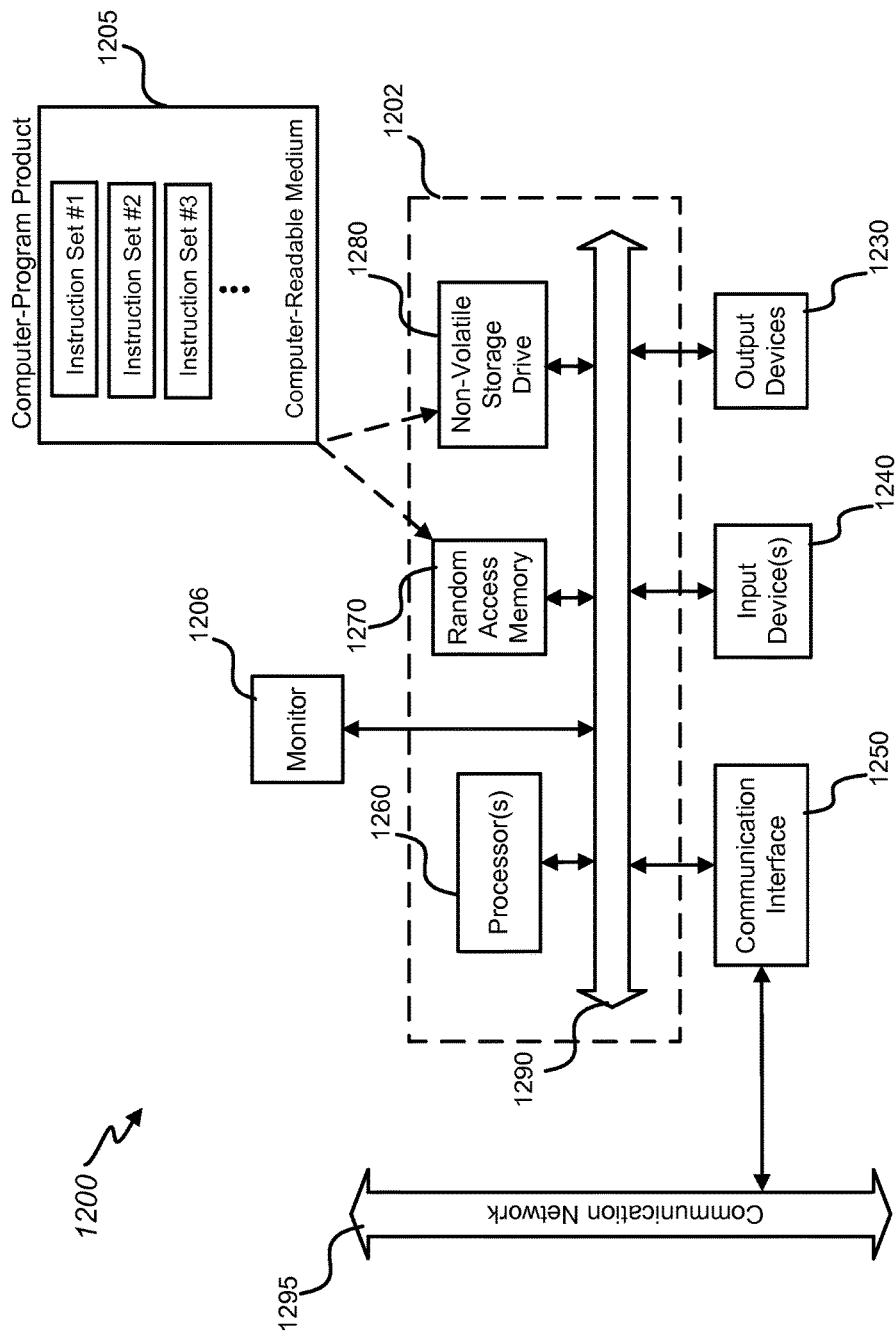
FIG. 12 depicts a block diagram of an embodiment of a special-purpose computer system, in accordance with certain embodiments of the present disclosure.

With reference to FIG. 12, an embodiment of a special-purpose computer system 1200 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1126, it is transformed into the special-purpose computer system 1200.

Special-purpose computer system 1200 comprises a computer 1202, a monitor 1206 coupled to computer 1202, one or more additional user output devices 1230 (optional) coupled to computer 1202, one or more user input devices 1240 (e.g., keyboard, mouse, track ball, touch screen) coupled to computer 1202, an optional communications interface 1250 coupled to computer 1202, a computer-program product 1205 stored in a tangible computer-readable memory in computer 1202. Computer-program product 1205 directs system 1200 to perform the above-described methods. Computer 1102 may include one or more processors 1260 that communicate with a number of peripheral devices via a bus subsystem 1290. These peripheral devices may include user output device(s) 1230, user input device(s) 1240, communications interface 1250, and a storage subsystem, such as random access memory (RAM) 1270 and non-volatile storage drive 1280 (e.g., disk drive, optical drive, solid state drive), which are forms of tangible computer-readable memory.

Computer-program product 1205 may be stored in non-volatile storage drive 1280 or another computer-readable medium accessible to computer 1202 and loaded into memory 1270. Each processor 1260 may comprise a microprocessor, such as a microprocessor from Intel® or Advanced Micro Devices, Inc.®, or the like. To support computer-program product 1205, the computer 1202 runs an operating system that handles the communications of product 1205 with the above-noted components, as well as the communications between the above-noted components in support of the computer-program product 1205. Exemplary operating systems include Windows® or the like from Microsoft® Corporation, Solaris® from Oracle®, LINUX, UNIX, and the like.

User input devices 1240 include all possible types of devices and mechanisms to input information to computer system 1202. These may include a keyboard, a keypad, a mouse, a scanner, a digital drawing pad, a touch screen incorporated into the display, audio input devices such as voice recognition systems, microphones, and other types of input devices. In various embodiments, user input devices 1240 are typically embodied as a computer mouse, a trackball, a track pad, a joystick, wireless remote, a drawing tablet, a voice command system. User input devices 1240 typically allow a user to select objects, icons, text and the like that appear on the monitor 1206 via a command such as a click of a button or the like. User output devices 1230 include all possible types of devices and mechanisms to output information from computer 1202. These may include a display (e.g., monitor 1206), printers, non-visual displays such as audio output devices, etc.

Communications interface 1250 provides an interface to other communication networks 1295 and devices and may serve as an interface to receive data from and transmit data to other systems, WANs and/or the Internet. Embodiments of communications interface 1250 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1250 may be coupled to a computer network, to a FireWire® bus, or the like. In other embodiments, communications interface 1250 may be physically integrated on the motherboard of computer 1102, and/or may be a software program, or the like.

RAM 1270 and non-volatile storage drive 1280 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1270 and non-volatile storage drive 1280 may be configured to store the basic programming and data constructs that provide the functionality of various embodiments of the present invention, as described above.

Software instruction sets that provide the functionality of the present invention may be stored in RAM 1270 and non-volatile storage drive 1280. These instruction sets or code may be executed by the processor(s) 1260. RAM 1270 and non-volatile storage drive 1280 may also provide a repository to store data and data structures used in accordance with the present invention. RAM 1270 and non-volatile storage drive 1280 may include a number of memories including a main random access memory (RAM) to store of instructions and data during program execution and a read-only memory (ROM) in which fixed instructions are stored. RAM 1270 and non-volatile storage drive 1280 may include a file storage subsystem providing persistent (non-volatile) storage of program and/or data files. RAM 1270 and non-volatile storage drive 1280 may also include removable storage systems, such as removable flash memory.

Bus subsystem 1290 provides a mechanism to allow the various components and subsystems of computer 1202 communicate with each other as intended. Although bus subsystem 1290 is shown schematically as a single bus, alternative embodiments of the bus subsystem may utilize multiple busses or communication paths within the computer 1202.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. An accredited advisor management system comprising:
one or more network interfaces configured to provide access to a network;
one or more storage media coupled to one or more processors to retain instructions executed by the processor to:
receive input data indicating an advising need of an advisee;
collect a geolocation, detected by a location device, of an end-user communication device of the advisee;
identify a set of advisors having experience with the advising need of the advisee for a determined geographic area of the detected geolocation;
present visible indicia of the set of advisors to a display device of the end-user communication device of the advisee to enable the advisee to select an advisor from the set of advisors;
detect an indication of a selection of an advisor, from the set of advisors, in response to detecting a selection of a user selectable option corresponding to the advisor from the visible indicia of the set of advisors;
verify the credentials of the advisor for the detected geolocation and that the advisor is authorized to provide advice on the advising need of the advisee in the determined geographic area of the detected geolocation;
provide a communication reference to the end-user communication device of the advisee in response to verifying the credentials of the selected advisor;
establish a real-time communication connection by routing a telephone call between the end-user communication device of the advisee and an end-user device of the advisor, in response to detecting an indication of a selection of the communication reference, to discuss the advising need of the advisee;
perform a voice analysis on detected speech of the advisee detected during the telephone call to determine voice analysis results comprising an emotional state of the advisee; and
provide the voice analysis results graphically via an advisor dashboard to the end-user device of the advisor.

2. The accredited advisor management system of claim 1, the one or more processors to further execute the instructions to:
consolidate a first set of advisor information at least partially based on input from the advisor and on a set of credential information, relating to the advisor, including an accreditation attribute about an accreditation attribute corresponding to the advisor;
prepare a second set of advisor information from the first set of advisor information for exposure to advisees;
prior to detecting the indication of the selection:
process an indication of an interest of the advisee in a first advising service;
match the indication of the interest of the advisee in the first advising service to a first category from a set of categories of advising services;
process a third set of advisor information at least partially based on the first category and the detected geolocation of the end-user communication device of the advisee, wherein the third set of advisor information relates to another set of one or more advisors, the another set of one or more advisors comprising the advisor; and
transmit at least the part of the third set of advisor information via the network to the end-user communication device.

3. The accredited advisor management system of claim 2, wherein the second set of advisor information comprises a set of anonymized information, and wherein the one or more processors to further execute instructions to:
perform the preparing of the second set of advisor information by generating the set of anonymized information at least partially based on the first set of advisor information and at least partially based on one or both of the first category and the detected geolocation, the set of anonymized information comprising a modified set of credential information that comprises a portion of the set of credential information, wherein the generating the set of anonymized information comprises:
determining that the set of credential information should be modified with respect to at least a first item of credential information from the set of credential information;
consequent to the determining, modify the set of credential information with respect to at least the first item of credential information so that the first item of credential information is either absent from the modified set of credential information or replaced with a second item of credential information that is included in the modified set of credential information, wherein the second item of credential information corresponds to a characterization of the first item of credential information at least partially based on a categorization of the first item of credential information; and
transmit at least the part of the second set of advisor information and the set of anonymized information to the end-user communication device.

4. The accredited advisor management system of claim 1, the one or more processors to further execute instructions to:
perform the verifying of the credentials by verifying one or more jurisdiction requirements pertaining to the detected geolocation regarding required qualifications for advisors in the determined geographic area of the detected geolocation.

5. The accredited advisor management system of claim 3, the one or more processors to further execute instructions to:
verify at least one of the credentials of the advisor based at least in part on the set of credential information.

6. The accredited advisor management system of claim 2, wherein:
the consolidating the first set of advisor information is further based at least in part on the detected geolocation.

7. The accredited advisor management system of claim 2, the one or more processors to further execute instructions to:
process third information enabling unique identification of a second advisor;
match the second advisor to a second category from the set of categories of advising services, the second category representing a second classification of a second set of advising services sharing a second set of common attributes;

process input from the second advisor based at least in part on the second category, the input comprising an indication of one or more advising services relating to the second advisor, and an indication of one or more credentials of the second advisor;

select one or more data sources based at least in part on the second category, the one or more data sources corresponding to one or more accrediting authorities; and process a set of credential information that came electronically from at least one of the one or more data sources, the set of credential information relating to the second advisor and including fourth information about an accreditation attribute corresponding to the second advisor, wherein the first category is different from the second category.

8. A method for facilitating communication with an advisor, the method comprising:

receiving, via the computer system, input data indicating an advising need of an advisee;

collecting a geolocation, detected by a location device, of an end-user communication device of a first advisee;

identifying, via the computer system, a set of advisors having experience with the advising need of the advisee for a determined geographic area of the detected geolocation;

presenting, via the computer system, visible indicia of the set of advisors to a display device of the end-user communication device of the advisee to enable the advisee to select an advisor from the set of advisors;

detecting, via the computer system, an indication of a selection of an advisor, from the set of advisors, in response to detecting a selection of a user selectable option corresponding to the advisor from the visible indicia of the set of advisors;

verifying, via the computer system, the credentials of the advisor for the detected geolocation and that the advisor is authorized to provide advice on the advising need of the advisee in the determined geographic area of the detected geolocation;

providing, via the computer system, a communication reference to the end-user communication device of the advisee in response to verifying the credentials of the advisor;

establishing a real-time communication connection by routing a telephone call, via the computer system, between the end-user communication device of the advisee and an end-user device of the advisor, in response to detecting an indication of a selection of a communication reference, to discuss the advising need of the advisee;

performing a voice analysis, via the computer system, on detected speech of the advisee detected during the telephone call to determine voice analysis results comprising an emotional state of the advisee; and providing, via the computer system, the voice analysis results graphically via an advisor dashboard to the end-user device of the advisor.

9. The method for facilitating communication with an advisor of claim 8, further comprising:

consolidating a first set of advisor information at least partially based on input from the selected advisor and on a set of credential information, relating to the advisor, including an accreditation attribute corresponding to the advisor;

preparing a second set of advisor information from the first set of advisor information for exposure to advisees;

prior to detecting the indication of the selection:
processing an indication of an interest of the advisee in a first advising service;

matching the indication of the interest of the advisee in the first advising service to a first category from a set of categories of advising services;

processing a third set of advisor information at least partially based on the first category and the detected geolocation of the end-user communication device of the advisee, wherein the third set of advisor information relates to another set of one or more advisors, the another set of one or more advisors comprising the advisor; and transmitting at least the part of the third set of advisor information via the network to the end-user communication device.

10. The method for facilitating communication with an advisor of claim 9, wherein:

the second set of advisor information comprises a set of anonymized information, and preparing the second set of advisor information comprises:

generating the set of anonymized information at least partially based on the first set of advisor information and at least partially based on one or both of the first category and the detected geolocation, the set of anonymized information comprising a modified set of credential information that comprises a portion of the set of credential information, wherein the generating the set of anonymized information comprises:

determining that the set of credential information should be modified with respect to at least a first item of credential information from the set of credential information;

consequent to the determining, modifying the set of credential information with respect to at least the first item of credential information so that the first item of credential information is either absent from the modified set of credential information or replaced with a second item of credential information that is included in the modified set of credential information, wherein the second item of credential information corresponds to a characterization of the first item of credential information at least partially based on a categorization of the first item of credential information; and transmitting at least the part of the second set of advisor information and the set of anonymized information to the end-user communication device.

11. The method for facilitating communication with an advisor of claim 8, wherein:

verifying further comprises verifying one or more jurisdiction requirements pertaining to the detected geolocation regarding required qualifications for advisors in the determined geographic area of the detected geolocation.

12. The method for facilitating communication with an advisor of claim 9, further comprising:

verifying at least one of the credentials of the advisor based at least in part on the set of credential information.

13. The method for facilitating communication with an advisor of claim 9, wherein:

the consolidating the first set of advisor information is further based at least in part on the detected geolocation.

14. The method for facilitating communication with an advisor of claim 9, further comprising:
processing third information enabling unique identification of a second advisor;
matching the second advisor to a second category from the set of categories of advising services, wherein the second advisor matches one or more categories of the set of categories, the second category representing a second classification of a second set of advising services sharing a second set of common attributes;
processing input from the second advisor based at least in part on the second category, the input comprising an indication of one or more advising services relating to the second advisor, and third information to indicate one or more credentials of the second advisor;
selecting one or more data sources based at least in part on the second category, the first set of one or more data sources corresponding to one or more accrediting authorities;
processing a set of credential information that came electronically from at least one of the one or more data sources, the set of credential information relating to the second advisor and including fourth information about an accreditation attribute corresponding to the second advisor, wherein the first category is different from the second category.

15. One or more non-transitory, machine-readable media having machine-readable instructions thereon for facilitating communication with an advisor, which instructions, when executed by one or more computers or other processing devices, cause the one or more computers or other processing devices to:
receive input data indicating an advising need of an advisee;
collect a geolocation, detected by a location device, of an end-user communication device of a first advisee;
identify a set of advisors having experience with the advising need of the advisee for a determined geographic area of the detected geolocation;
present visible indicia of the set of advisors to a display device of the end-user communication device of the advisee to enable the advisee to select an advisor from the set of advisors;
detect an indication of a selection of an advisor, from the set of advisors, in response to detecting a selection of a user selectable option corresponding to the advisor from the visible indicia of the set of advisors;
verify the credentials of the advisor for the detected geolocation and that the advisor is authorized to provide advice on the advising need of the advisee in the determined geographic area of the detected geolocation;
provide a communication reference to the end-user communication device of the advisee in response to verifying the credentials of the advisor;
establish a real-time communication connection by routing a telephone call between the end-user communication device of the first advisee and an end-user device of the first advisor, in response to detecting an indication of a selection of a communication reference, to discuss the advising need of the first advisee;
perform a voice analysis on detected speech of the advisee detected during the telephone call to determine voice analysis results comprising an emotional state of the advisee; and
provide the voice analysis results graphically via an advisor dashboard to the end-user device of the advisor.

16. The one or more non-transitory, machine-readable media of claim 15, wherein the instructions, when executed by the one or more computers or other processing devices, cause the one or more computers or other processing devices to further:
consolidate a first set of advisor information at least partially based on input from the advisor and on a set of credential information, relating to the advisor, including an accreditation attribute corresponding to the advisor;
prepare a second set of advisor information from the first set of advisor information for exposure to advisees;
prior to detecting the indication of the selection:
process an indication of an interest of the advisee in a first advising service;
match the indication of the interest of the advisee in the first advising service to a first category from a set of categories of advising services;
process a third set of advisor information at least partially based on the first category and the detected geolocation, wherein the third set of advisor information relates to another set of one or more advisors, the another set of one or more advisors comprising the advisor; and
transmit at least the part of the third set of advisor information via the network to the end-user communication device.

17. The one or more non-transitory, machine-readable media of claim 16, wherein the second set of advisor information comprises a set of anonymized information, and the instructions, when executed by the one or more computers or other processing devices, cause the one or more computers or other processing devices to further:
perform the preparing of the second set of advisor information by generating the set of anonymized information at least partially based on the first set of advisor information and at least partially based on one or both of the first category and the detected geolocation, the set of anonymized information comprising a modified set of credential information that comprises a portion of the set of credential information, wherein the generating the set of anonymized information comprises:
determining that the set of credential information should be modified with respect to at least a first item of credential information from the set of credential information; and
consequent to the determining, modify the set of credential information with respect to at least the first item of credential information so that the first item of credential information is either absent from the modified set of credential information or replaced with a second item of credential information that is included in the modified set of credential information, wherein the second item of credential information corresponds to a characterization of the first item of credential information at least partially based on a categorization of the first item of credential information; and
transmit at least the part of the second set of advisor information and the set of anonymized information.

18. The one or more non-transitory, machine-readable media of claim 15, wherein the instructions, when executed by the one or more computers or other processing devices, cause the one or more computers or other processing devices to further:

perform the verifying of the credentials by verifying one or more jurisdiction requirements pertaining to the detected geolocation regarding required qualifications for advisors in the determined geographic area of the detected geolocation.

19. The one or more non-transitory, machine-readable media of claim 16, wherein the instructions, when executed by the one or more computers or other processing devices, cause the one or more computers or other processing devices to further:

verify at least one of the credentials of the advisor based at least in part on the set of credential information.

20. The one or more non-transitory, machine-readable media of claim 16, wherein:

the consolidating the first set of advisor information is further based at least in part on the detected geolocation.

* * * * *